(12) United States Patent
Morita

(10) Patent No.: US 11,148,544 B2
(45) Date of Patent: Oct. 19, 2021

(54) VEHICLE BACKUP DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Kyohei Morita, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 266 days.

(21) Appl. No.: 16/341,107

(22) PCT Filed: Oct. 4, 2017

(86) PCT No.: PCT/JP2017/036080
§ 371 (c)(1),
(2) Date: Apr. 11, 2019

(87) PCT Pub. No.: WO2018/070314
PCT Pub. Date: Apr. 19, 2018

(65) Prior Publication Data
US 2020/0189414 A1 Jun. 18, 2020

(30) Foreign Application Priority Data

Oct. 13, 2016 (JP) .............................. JP2016-201436

(51) Int. Cl.
*B60L 53/62* (2019.01)
*B60L 58/16* (2019.01)
(Continued)

(52) U.S. Cl.
CPC ............... *B60L 53/62* (2019.02); *B60L 58/16* (2019.02); *B60L 58/20* (2019.02); *B60L 58/25* (2019.02); *B60L 2240/12* (2013.01)

(58) Field of Classification Search
CPC .. B60L 7/34; B60L 53/62; B60L 58/16; B60L 58/20; B60L 58/25; B60L 2240/12;
(Continued)

(56) References Cited

U.S. PATENT DOCUMENTS

| | | | |
|---|---|---|---|
| 2004/0150516 A1* | 8/2004 | Faetanini | B60C 23/0408 340/444 |
| 2005/0253458 A1* | 11/2005 | Omae | H02J 7/34 307/10.1 |

(Continued)

FOREIGN PATENT DOCUMENTS

| | | |
|---|---|---|
| JP | 2012-091629 A | 5/2012 |
| JP | 2013-176197 | 5/2013 |

OTHER PUBLICATIONS

International Search Report, Application No. PCT/JP2017/036080, dated Jan. 16, 2018. ISA/Japan Patent Office.

*Primary Examiner* — Paul Dinh
(74) *Attorney, Agent, or Firm* — Honigman LLP

(57) ABSTRACT

A backup device includes: a charging unit that charges a second power source unit on the basis of the power supply from a first power source unit; a voltage detection unit detects the output voltage of the second power source unit; a vehicle speed information acquisition unit acquires vehicle speed information; and a control unit sets, on the basis of at least the vehicle speed information acquired by the vehicle speed information acquisition unit, a charging target voltage according to a setting method in which the voltage is set higher as the vehicle speed indicated by the vehicle speed information is greater, and causes, on the basis of the output voltage of the second power source unit detected by the (Continued)

voltage detection unit, the charging unit to perform the charging operation so as to bring the output voltage of the second power source unit close to the charging target voltage.

12 Claims, 8 Drawing Sheets

(51) Int. Cl.
*B60L 58/20* (2019.01)
*B60L 58/25* (2019.01)

(58) Field of Classification Search
CPC .......... H02J 7/1423; H02J 7/1446; H02J 1/08; H02J 2310/52; H02J 2310/46; Y02T 90/12; Y02T 10/7072; Y02T 10/70; B60R 16/03; B60R 16/033; B60R 16/04; B60W 50/02; F16H 61/12
USPC ................................. 320/103–104, 126, 167
See application file for complete search history.

(56) References Cited

U.S. PATENT DOCUMENTS

| | | |
|---|---|---|
| 2007/0173984 A1 | 7/2007 | Nakayama |
| 2009/0112496 A1 | 4/2009 | Suzuki |
| 2015/0236536 A1 | 8/2015 | Aradachi et al. |

\* cited by examiner

|   |   | Temperature [°C] | | | |
|---|---|---|---|---|---|
|   |   | ~-20 | -20~0 | 0~20 | 20~ |
| E | A | Y | X | W | U |
|   | B | Y | Y | X | W |
|   | C | Z | Y | Y | X |
|   | D | Z | Z | Y | Y |

Legend
E= Degradation

|   |   | Vehicle speed (km/h) | | | |
|---|---|---|---|---|---|
|   |   | ~5 | 5~50 | 50~100 | 100~ |
| A | U | V1 | V1+x | V1+2x | V1+3x |
|   | W | V1+x | V1+2x | V1+3x | V1+4x |
|   | X | V1+2x | V1+3x | V1+4x | V1+5x |
|   | Y | V1+3x | V1+4x | V1+5x | V1+6x |
|   | Z | V1+4x | V1+5x | V1+6x | V1+7x |

(B)

|   |   | Vehicle speed (km/h) | | | |
|---|---|---|---|---|---|
|   |   | ~5 | 5~50 | 50~100 | 100~ |
| A | U | V2 | V2+y | V2+2y | V2+3y |
|   | W | V2+y | V2+2y | V2+3y | V2+4y |
|   | X | V2+2y | V2+3y | V2+4y | V2+5y |
|   | Y | V2+3y | V2+4y | V2+5y | V2+6y |
|   | Z | V2+4y | V2+5y | V2+6y | V2+7y |

Legend
A= Degradation-temperature index

VEHICLE BACKUP DEVICE

CROSS-REFERENCE TO RELATED APPLICATIONS

This application is the U.S. national stage of PCT/JP2017/036080 filed Oct. 4, 2017, which claims priority of Japanese Patent Application No. JP 2016-201436 filed Oct. 13, 2016, the contents of which are incorporated herein.

TECHNICAL FIELD

The present disclosure relates to a vehicle backup device.

BACKGROUND

Vehicles having electronic control systems, such as shift-by-wire control systems and electric parking brake systems, continue to become more common in recent years, as exemplified by the vehicles disclosed in Japanese Patent No. 4171495. In this kind of vehicle, there is a risk that if the main power source fails and the power supply is cut off, the electronic control system will cease operating. Some method for carrying out backup operations is therefore necessary. The need for such backup operations in particular continues to grow as the importance of electronic control systems increases.

To respond to the need for such backup operations, recent vehicle power source systems propose techniques where an auxiliary power source functioning as a backup power source is discharged to continue to supply power to a backup target (e.g., a shift-by-wire control system or a electric parking brake system) in the event that the main power source has failed.

With such backup devices, if the output voltage of the auxiliary power source is low at the point in time when the start switch (e.g., the ignition switch) of the vehicle is switched on, the auxiliary power source must be charged to an appropriate output voltage (an output voltage capable of operating the device to be backed up) after the vehicle has started. However, what voltage to set as the charging target voltage when charging the auxiliary power source is an issue. For example, if the charging target voltage is set too high when charging the auxiliary power source, it will take a long time to reach the charging target voltage, resulting in a longer wait time for charging. On the other hand, if the charging target voltage is set too low, in situations where the auxiliary power source is experiencing reduced performance due, for example, to low temperatures or advanced degradation, there is a risk that a sufficient operating voltage cannot be supplied from the auxiliary power source to the backup target.

Having been achieved on the basis of the above-described circumstances, an object of the present disclosure is to provide a backup device that, when the supply of power from a first power source unit is cut off, can back up using power supplied from a second power source unit, and that can effectively set a charging target voltage for the second power source unit in accordance with the situation.

SUMMARY

A first aspect of the disclosure is a backup device for a vehicle power source system, the power source system including a first power source unit installed in the vehicle and a second power source unit serving as a power supply source at least when a power supply from the first power source unit has been cut off, the backup device including: a charging unit that carries out a charging operation of charging the second power source unit on the basis of the power supply from the first power source unit; a voltage detection unit that detects an output voltage of the second power source unit; a vehicle speed information acquisition unit that acquires vehicle speed information; and a control unit that, on the basis of at least the vehicle speed information acquired by the vehicle speed information acquisition unit, sets a charging target voltage to be higher the greater a vehicle speed indicated by the vehicle speed information is, and, on the basis of the output voltage of the second power source unit detected by the voltage detection unit, causes the charging unit to carry out a charging operation for bringing the output voltage of the second power source unit closer to the charging target voltage.

A second aspect of the disclosure is a backup device for a vehicle power source system, the power source system including a first power source unit installed in the vehicle and a second power source unit serving as a power supply source at least when a power supply from the first power source unit has been cut off, the backup device including: a charging unit that carries out a charging operation of charging the second power source unit on the basis of the power supply from the first power source unit; a voltage detection unit that detects an output voltage of the second power source unit; a switch state detection unit that detects an on state in a starting switch that starts a driving power source of the vehicle; and a control unit that, when the switch state detection unit has detected the on state in the starting switch, causes the charging unit to carry out a charging operation for bringing the output voltage of the second power source unit closer to a set first charging target voltage on the basis of the output voltage of the second power source unit detected by the voltage detection unit, outputs a notification signal to the exterior when the output voltage of the second power source unit has reached the first charging target voltage, and after outputting the notification signal, causes the charging unit to carry out a charging operation for bringing the output voltage of the second power source unit closer to a second charging target voltage that is greater than the first charging target voltage.

ADVANTAGEOUS EFFECTS OF DISCLOSURE

In a power source system in which the backup device according to the first aspect of the disclosure is applied, it is assumed that when the supply of power from the first power source unit has been cut off, it will take a greater amount of time for the vehicle to stop the higher the vehicle speed is at the point in time when the supply of power from the first power source unit is stopped. In other words, it is assumed that more power will be necessary for the backup the higher the vehicle speed is at the point in time when the supply of power from the first power source unit is stopped. Accordingly, by setting the charging target voltage to be higher the higher the vehicle speed indicated by the vehicle speed information is and causing the charging unit to carry out the charging operation for bringing the output voltage of the second power source unit closer to the set charging target voltage as in the first aspect of the disclosure, an increased amount of power can be supplied from the second power source unit the higher the vehicle speed is, and the output voltage of the second power source unit can be effectively set in accordance with the traveling state of the vehicle.

Thus according to the first aspect of the disclosure, even if the supply of power from the first power source unit has been cut off, that power supply can be backed up by the supply of power from the second power source unit, and the charging target voltage for the second power source unit can be effectively set in accordance with the circumstances.

In the backup device according to the second aspect of the disclosure, when the switch state detection unit has detected that the starting switch is in the on state, the control unit causes the charging unit to carry out the charging operation for bringing the output voltage of the second power source unit closer to the set first charging target voltage on the basis of the output voltage of the second power source unit detected by the voltage detection unit, and outputs the notification signal to the exterior when the output voltage of the second power source unit has reached the first charging target voltage. The notification signal can therefore be output to the exterior at a stage partway through the charging operation carried out after the starting switch has switched on (a stage where the first charging target voltage has been reached), and thus a device that has acquired the notification signal can carry out prescribed operations having reliably confirmed that the output voltage of the second power source unit has reached the first charging target voltage. In other words, an environment in which an external device can carry out prescribed operations having reliably confirmed that the output voltage of the second power source unit has reached the first charging target voltage can be realized more quickly after the starting switch has switched on. Additionally, the charging unit is caused to carry out the charging operation for bringing the output voltage of the second power source unit closer to the second charging target voltage, which is greater than the first charging target voltage, after the notification signal has been output, and it is therefore easier to secure the backup voltage required by devices for which it is desirable to have a greater backup voltage (the output voltage of the second power source unit) than the first charging target voltage after preferentially outputting the notification signal.

Thus according to the second aspect of the disclosure, even if the supply of power from the first power source unit has been cut off, that power supply can be backed up by the supply of power from the second power source unit, and the charging target voltage for the second power source unit can be effectively set in accordance with the circumstances.

BRIEF DESCRIPTION OF DRAWINGS

FIG. 6A is a table illustrating a determination method for determining a first charging target voltage on the basis of a vehicle speed and the degradation-temperature index, and FIG. 6B is a table illustrating a determination method for determining a second charging target voltage on the basis of the vehicle speed and the degradation-temperature index.

DETAILED DESCRIPTION OF PREFERRED EMBODIMENTS

Figure 1:
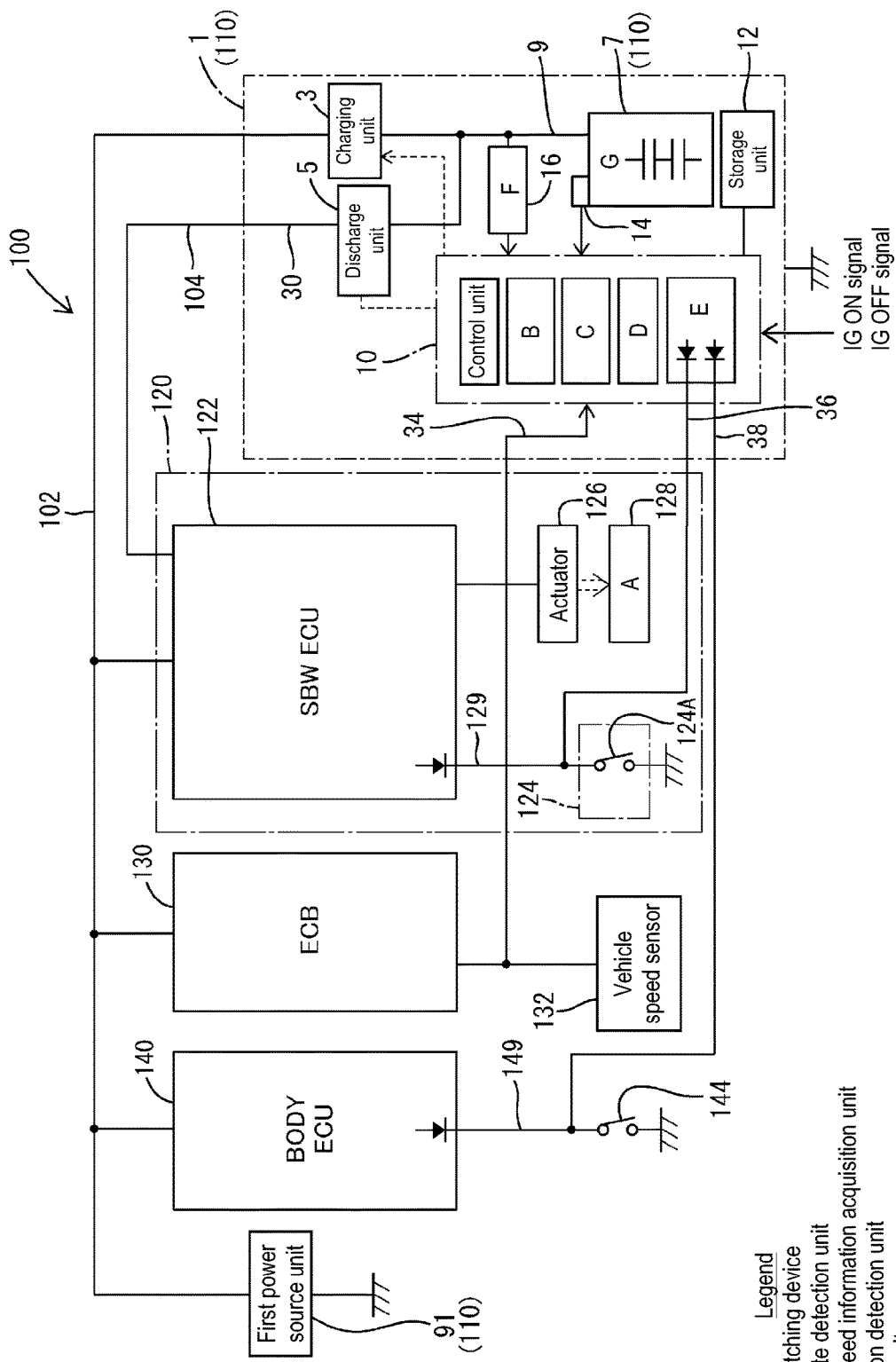
FIG. 1 is a block diagram schematically illustrating an example of a vehicle electronic control system including a vehicle backup device according to a first embodiment.

Preferred examples of the present disclosure will be described here. However, the present disclosure is not limited to the following examples.

The vehicle backup device according to the first aspect of the disclosure may include the degradation detection unit, which detects degradation of the second power source unit. On the basis of at least the vehicle speed information acquired by the vehicle speed information acquisition unit and the degradation detected by the degradation detection unit, the control unit may set the charging target voltage to be higher the greater the degradation detected by the degradation detection unit is, and cause the charging unit to carry out the charging operation for bringing the output voltage of the second power source unit closer to the charging target voltage.

The above-described backup device can more appropriately set the charging target voltage so as to reflect the degradation of the second power source unit, in addition to the vehicle speed. As the degree of degradation of the second power source unit increases, the performance of the second power source unit decreases due to a drop in the capacitance and a rise in the internal resistance, and thus if the charging target voltage is set to be higher the greater the degradation detected by the degradation detection unit is, the output voltage of the second power source unit can be set more appropriately in accordance with the degree of degradation of the second power source unit.

The vehicle backup device according to the first aspect of the disclosure may further include: a degradation information storage unit that stores degradation information identifying the detected degradation after the degradation detection unit has detected the degradation of the second power source unit; and a switch state detection unit that detects an on state in a starting switch that starts a driving power source of the vehicle When the switch state detection unit has detected the on state in the starting switch, the control unit may set the charging target voltage on the basis of the degradation information stored in the degradation information storage unit from before the switch state detection unit has detected the on state in the starting switch and the vehicle speed information acquired by the vehicle speed information acquisition unit after the switch state detection unit has detected the on state in the starting switch, and cause the charging unit to carry out the charging operation for bringing the output voltage of the second power source unit closer to the charging target voltage.

In this manner, if the degradation information stored in the degradation information storage unit from before the switch state detection unit detects the on state in the starting switch is used, it is no longer necessary to measure the degradation after the on state has been detected in the starting switch, and the time it takes for the output voltage of the second power source unit to reach the charging target voltage after the starting switch has switched on can be shortened by that amount. Additionally, it is unlikely that the degradation of the second power source unit will advance suddenly before or after the switching of the starting switch, and thus a high level of accuracy can be achieved even when using the degradation information stored in the degradation information storage unit from before the on state is detected in the starting switch.

The vehicle backup device according to the first aspect of the disclosure may further include a temperature detection unit that detects a temperature of the second power source unit. The control unit may set the charging target voltage on the basis of at least the vehicle speed information acquired by the vehicle speed information acquisition unit and the temperature of the second power source unit detected by the temperature detection unit, and cause the charging unit to carry out the charging operation for bringing the output voltage of the second power source unit closer to the charging target voltage.

In this manner, the backup device can set the charging target voltage so as to reflect not only the vehicle speed, but also the temperature. The temperature of the second power source unit is closely related to the performance of the second power source unit, and thus setting the charging target voltage on the basis of the vehicle speed information acquired by the vehicle speed information acquisition unit and the temperature of the second power source unit detected by the temperature detection unit makes it possible to more appropriately set the output voltage of the second power source unit.

The vehicle backup device according to the first aspect of the disclosure may further include: a degradation detection unit that detects degradation of the second power source unit; a degradation information storage unit that stores degradation information identifying the detected degradation after the degradation detection unit has detected the degradation of the second power source unit; a temperature detection unit that detects a temperature of the second power source unit; and a switch state detection unit that detects an on state in a starting switch that starts a driving power source of the vehicle. When the switch state detection unit has detected the on state in the starting switch, the control unit may set the charging target voltage on the basis of the degradation information stored in the degradation information storage unit from before the switch state detection unit has detected the on state in the starting switch, the temperature of the second power source unit detected by the temperature detection unit after the switch state detection unit has detected the on state in the starting switch, and the vehicle speed information acquired by the vehicle speed information acquisition unit after the temperature detection unit has detected the temperature of the second power source unit, and cause the charging unit to carry out the charging operation for bringing the output voltage of the second power source unit closer to the charging target voltage.

In this manner, if the degradation information stored in the degradation information storage unit from before the switch state detection unit detects the on state in the starting switch is used, it is no longer necessary to measure the degradation after the on state has been detected in the starting switch, and the time it takes for the output voltage of the second power source unit to reach the charging target voltage after the starting switch has switched on can be shortened by that amount. Additionally, it is unlikely that the degradation of the second power source unit will advance suddenly before or after the switching of the starting switch, and thus a high level of accuracy can be achieved even when using the degradation information stored in the degradation information storage unit from before the on state is detected in the starting switch. On the other hand, with respect to the temperature and the vehicle speed, the temperature of the second power source unit and the vehicle speed confirmed after the switch state detection unit has detected the on state in the starting switch are used, and thus the output voltage of the second power source unit can be set more appropriately using the temperature and vehicle speed from a time close to the time at which the charging target voltage is set. Furthermore, it is likely that the temperature of the second power source unit will vary at a lower rate than the vehicle speed during a period from when the starting switch has switched on to when the output voltage of the second power source unit reaches the charging target voltage, and is therefore easier to use more accurate data for the temperature of the second power source unit and the vehicle speed by detecting the temperature of the second power source unit and using the temperature in the computations before the vehicle speed.

The vehicle backup device according to the second aspect of the disclosure may include the degradation detection unit, which detects degradation of the second power source unit, When the switch state detection unit has detected the on state in the starting switch, the control unit may set the first charging target voltage on the basis of at least the degradation detected by the degradation detection unit, using a setting method that sets the voltage to be higher the greater the degradation detected by the degradation detection unit is, and causes the charging unit to carry out the charging operation for bringing the output voltage of the second power source unit closer to the first charging target voltage.

The above-described backup device can more appropriately set the first charging target voltage so as to reflect the degradation of the second power source unit. As the degree of degradation of the second power source unit increases, the performance of the second power source unit decreases due to a drop in the capacitance and a rise in the internal resistance, and thus if the first charging target voltage is set using a setting method in which the voltage is set higher the greater the degradation detected by the degradation detection unit is, the output voltage of the second power source unit can be set more appropriately in accordance with the degree of degradation of the second power source unit. In particular, the first charging target voltage can be more appropriately lowered when there is a low degree of degradation in the second power source unit, and thus the amount of time from when the starting switch switches on to when the output voltage of the second power source unit reaches the first charging target voltage can be shortened.

The vehicle backup device according to the second aspect of the disclosure may further include a degradation information storage unit that stores degradation information identifying the detected degradation after the degradation detection unit has detected the degradation of the second power source unit. When the switch state detection unit has detected the on state in the starting switch, the control unit may set the first charging target voltage on the basis of the degradation information stored in the degradation information storage unit from before the switch state detection unit has detected the on state in the starting switch, and cause the charging unit to carry out the charging operation for bringing the output voltage of the second power source unit closer to the first charging target voltage.

In this manner, if the degradation information stored in the degradation information storage unit from before the switch state detection unit detects the on state in the starting switch is used, it is no longer necessary to measure the degradation after the on state has been detected in the starting switch, and the time required can be shortened by that amount. There is particularly strong demand to shorten the time from when the starting switch turns on to when the output voltage of the second power source unit reaches the first charging target voltage as much as possible, and this demand can be met by using this configuration. Additionally, it is unlikely that the degradation of the second power source unit will advance suddenly, and thus a high level of accuracy can be achieved even when using the degradation information stored in the degradation information storage unit from before the on state is detected in the starting switch.

The vehicle backup device according to the second aspect of the disclosure may further include a temperature detection unit that detects a temperature of the second power source unit. When the switch state detection unit has detected the on state in the starting switch, the control unit may set the first charging target voltage on the basis of at least the temperature of the second power source unit detected by the temperature detection unit, and cause the charging unit to carry out the charging operation for bringing the output voltage of the second power source unit closer to the first charging target voltage.

The above-described backup device can set the first charging target voltage so as to reflect the temperature. The temperature of the second power source unit is closely related to the performance of the second power source unit, and thus setting the first charging target voltage on the basis of the temperature of the second power source unit detected by the temperature detection unit makes it possible to more appropriately set the output voltage of the second power source unit.

The vehicle backup device according to the second aspect of the disclosure may further include a vehicle speed information acquisition unit that acquires vehicle speed information. When the output voltage of the second power source unit has reached the first charging target voltage, the control unit may set the second charging target voltage on the basis of at least the vehicle speed information acquired by the vehicle speed information acquisition unit, using a setting method that sets the voltage to be higher the greater a vehicle speed indicated by the vehicle speed information is, and cause the charging unit to carry out a charging operation for bringing the output voltage of the second power source unit closer to the second charging target voltage on the basis of the output voltage of the second power source unit detected by the voltage detection unit.

In a power source system in which the backup device according to the second aspect of the disclosure is applied, it is assumed that when the supply of power from the first power source unit has been cut off, it will take a greater amount of time for the vehicle to stop the higher the vehicle speed is at the point in time when the supply of power from the first power source unit is stopped. In other words, it is assumed that more power will be necessary for the backup the higher the vehicle speed is at the point in time when the supply of power from the first power source unit is stopped. Thus by setting the second charging target voltage through a setting method in which the voltage is set higher the higher the vehicle speed indicated by the vehicle speed information is, and causing the charging unit to carry out the charging operation for bringing the output voltage of the second power source unit closer to the set second charging target voltage as in this disclosure, an increased amount of power can be supplied from the second power source unit the higher the vehicle speed is, and the output voltage of the second power source unit can be effectively set in accordance with the traveling state of the vehicle.

The vehicle backup device according to the second aspect of the disclosure may include the degradation detection unit, which detects degradation of the second power source unit, When the output voltage of the second power source unit has reached the first charging target voltage, the control unit may set the second charging target voltage on the basis of at least the degradation detected by the degradation detection unit, using a setting method that sets the voltage to be higher the greater the degradation detected by the degradation detection unit is, and cause the charging unit to carry out the charging operation for bringing the output voltage of the second power source unit closer to the second charging target voltage.

The above-described backup device can more appropriately set the second charging target voltage so as to reflect the degradation of the second power source unit. As the degree of degradation of the second power source unit increases, the performance of the second power source unit decreases due to a drop in the capacitance and a rise in the internal resistance, and thus if the second charging target voltage is set using a setting method in which the voltage is set higher the greater the degradation detected by the degradation detection unit is, the output voltage of the second power source unit can be set more appropriately in accordance with the degree of degradation of the second power source unit.

The vehicle backup device according to the second aspect of the disclosure may further include a temperature detection unit that detects a temperature of the second power source unit. When the output voltage of the second power source unit has reached the first charging target voltage, the control unit may set the second charging target voltage on the basis of at least the temperature of the second power source unit detected by the temperature detection unit, and cause the charging unit to carry out the charging operation for bringing the output voltage of the second power source unit closer to the second charging target voltage.

The above-described backup device can set the second charging target voltage so as to reflect the temperature. The temperature of the second power source unit is closely related to the performance of the second power source unit, and thus setting the second charging target voltage on the basis of the temperature of the second power source unit detected by the temperature detection unit makes it possible to more appropriately set the output voltage of the second power source unit.

First Embodiment

A vehicle electronic control system 100 (also called a "system 100" hereinafter) illustrated in FIG. 1 is a system including: a vehicle power source system 110 (also called a "power source system 110" hereinafter) including a vehicle backup device 1 (also called a "backup device 1" hereinafter); and various targets to be supplied with power from the power source system 110 (a shift-by-wire control system 120, an electronically-controlled braking system 130, a body ECU 140, a vehicle speed sensor 132, and the like).

First, the units constituting the vehicle electronic control system 100 illustrated in FIG. 1 will be described with a particular focus on the backup device 1.

The shift-by-wire control system 120 is provided in a vehicle such as a passenger vehicle that uses an engine such as a gasoline engine as a source of power for driving, and switches the range of an automatic transmission such as a CVT or a stepped AT. The shift-by-wire control system 120 corresponds to an example of a backup target device, and operates so as to switch the shift range of the automatic transmission (not shown) using drive power from an actuator 126. The shift-by-wire control system 120 is constituted by a shift-by-wire ECU 122, a range switch 124, the actuator 126, a range switching device 128, and the like.

The shift-by-wire ECU 122 includes an information processing device such as a CPU, storage devices such as RAM and ROM, an input/output interface, a bus that connects these elements to each other, and the like. The range switch 124, which includes a parking switch 124A, is connected to the shift-by-wire ECU 122. Note that FIG. 1 illustrates the parking switch 124A for instructing a transition to the parking range as an example of the range switch 124, and other switches are not shown.

The range switching device 128 switches among a drive (D) range, a reverse (R) range, a neutral (N) range, and a parking (P) range of the automatic transmission in response to the actuator 126. The range switching device 128 is configured including a hydraulic control mechanism that engages and disengages a forward clutch and a reverse clutch, a parking lock mechanism that mechanically locks an output shaft, and the like. The D range corresponds to a state in which the forward clutch is engaged and the reverse clutch is disengaged. The R range corresponds to a state in which the forward clutch is disengaged and the reverse clutch is engaged. The N range corresponds to a state in which both the forward clutch and the reverse clutch are disengaged. The P range corresponds to a state in which both the forward clutch and the reverse clutch are disengaged and the parking lock mechanism is operating.

The actuator 126 is an electric actuator such as a motor or a solenoid, and has a function of driving the range switching device 128 to carry out range switching operations. The actuator 126 includes a shift position sensor (not shown) that detects which range (shift position) the range switching device 128 is in on the basis of the position of an internal driving member or the like, and shift position information detected by the shift position sensor is transmitted to the shift-by-wire ECU 122.

In the shift-by-wire control system 120 configured in this manner, the range switch 124 is provided in an operation unit, such as a shift lever, through which the driver inputs a range switching operation (selection operation), and the range switch 124 transmits a range request signal to the shift-by-wire ECU 122 in accordance with the range selected through the operation unit. In accordance with the range request signal from the range switch 124, the shift-by-wire ECU 122 drives the actuator 126 and operates the range switching device 128 to switch to the requested range.

The ECB (Electric Control Braking System) 130 is constituted by a known electronically-controlled braking system. This ECB 130 includes an ECB motor that produces braking force transmitted to a driving wheel of the vehicle, and an ECB electronic control device (ECB ECU) that controls the ECB motor. The ECB ECU outputs an operation command signal that causes the ECB motor to operate, and the ECB motor operates in accordance with the operation command signal. The ECB ECU outputs a drive signal that drives the ECB motor when it is determined, on the basis of sensor signals from the vehicle speed sensor 132, an accelerometer, a yaw rate sensor, a steering sensor, and the like, that it is necessary to start the ECB motor. The ECB motor operates in accordance with that drive signal, and that operation enables braking force adjustment, which makes it possible for the vehicle to behave in a stable manner.

The vehicle speed sensor 132 is configured as a known vehicle speed sensor, and outputs a signal indicating the speed of the vehicle. Although FIG. 1 illustrates an example in which a vehicle speed signal generated by the vehicle speed sensor 132 is input to the backup device 1 via a signal line 34, any configuration may be used as long as a control circuit 10 can confirm the vehicle speed specified by the vehicle speed signal generated by the vehicle speed sensor 132. For example, vehicle speed information specified by the vehicle speed signal generated by the vehicle speed sensor 132 may be input to the control circuit 10 via a CAN communication line.

The body ECU 140 is a device that controls units in a body system provided in the vehicle, and includes a control unit such as a CPU or an MPU, as well as a storage unit such as ROM, RAM, or non-volatile memory. The storage unit stores a control program executed by the control unit, and the control unit controls the operations of the units in the body system by executing the control program stored in the storage unit. A courtesy switch 144, which turns on when a door is opened, is connected to the body ECU 140.

The power source system 110 includes: a first power source unit 91, which is a power source unit installed in the vehicle and serves as a main power source for supplying power to a variety of targets such as those described above; a second power source unit 7 that serves as a power supply source when the supply of power from at least the first power source unit 91 is cut off and the backup device 1 including a function for discharging the second power source unit 7 when the supply of power from at least the first power source unit 91 is cut off. The power source system 110 is configured as a system that supplies power using the first power source unit 91 or the second power source unit 7 as a power supply source. Although the following describes a configuration in which the second power source unit 7 is included as part of the backup device 1, it should be noted that the second power source unit 7 may be provided outside the backup device 1.

In the power source system 110, an output voltage from the first power source unit 91 is applied to a wiring unit 102, which serves as a power line, when the first power source unit 91 is in a normal state where there is no drop in the supply of power. The power is supplied from the first power source unit 91 to various electrical components via the wiring unit 102. In this configuration, "when the first power source unit 91 is in a normal state where there is no drop in the supply of power" refers to a state where the output voltage from the first power source unit 91 is greater than a prescribed value, and specifically refers to a state where a voltage at the wiring unit 102 detected by the control circuit 10 is greater than the prescribed value. Conversely, "when the first power source unit 91 is in an abnormal state where the supply of power has dropped or been cut off" refers to a state where the output voltage from the first power source unit 91 is less than or equal to the prescribed value, and specifically refers to a state where a voltage at the wiring unit 102 detected by the control circuit 10 (a detection unit) is less than or equal to the prescribed value.

The first power source unit 91 is configured as a known type of vehicular battery, such as a lead battery, for example. A high potential-side terminal of the first power source unit 91 is electrically connected to the wiring unit 102, and applies a prescribed output voltage (also called a "+B voltage" hereinafter) to the wiring unit 102.

The second power source unit 7 is configured as a known storage means such as an electrical double-layer capacitor (EDLC), for example. The second power source unit 7 is electrically connected to a charging unit 3 and a discharging unit 5 via a conductive path 9, and is charged by the charging unit 3 and discharged by the discharging unit 5. The second power source unit 7 applies an output voltage based on a charge amount to the conductive path 9.

The backup device 1 includes the charging unit 3, the discharging unit 5, the above-described second power source unit 7, the control circuit 10, and the like.

The charging unit 3 is a circuit that carries out a charging operation of charging the second power source unit 7 on the basis of power supplied from the first power source unit 91, is configured as a known charging circuit such as a DC-DC converter, and is configured to be controlled by the control circuit 10. The control circuit 10 carries out charging control by supplying, to the charging unit 3, a charging instruction signal instructing the second power source unit 7 to be charged, or a charging stop signal instructing the charging of the second power source unit 7 to be stopped. The control circuit 10 causes the charging unit 3 to start the charging operations at, for example, a prescribed charging start time (e.g., when the ignition switch has been turned on), and supplies the charging instruction signal to the charging unit 3 until the output voltage of the second power source unit 7 (a charge voltage) has reached the set charging target voltage. When supplied with the charging instruction signal from the control circuit 10, the charging unit 3 carries out a voltage transform operation of stepping up or stepping down the power source voltage input via the wiring unit 102, and applies the transformed voltage to the conductive path 9 connected to the second power source unit 7. When the charging unit 3 is supplied with the charging stop signal from the control circuit 10, the charging unit 3 does not carry out the charging operations, and at that time, the wiring unit 102 and the second power source unit 7 are in a non-conductive state.

The discharging unit 5 is configured as a known discharging circuit such as a DC-DC converter, and is configured to be controlled by the control circuit 10. The control circuit 10 supplies the discharging unit 5 with a discharge instruction signal, which instructs the second power source unit 7 to be discharged, or a discharge stop signal, which instructs the discharging of the second power source unit 7 to stop. When the discharge instruction signal is supplied from the control circuit 10, the discharging unit 5 carries out a discharge operation, in which a step-up operation or a step-down operation is carried out with the voltage at the conductive path 9, to which the output voltage of the second power source unit 7 is applied, as an input voltage, and a set target voltage is applied to an output-side conductive path 30 connected to a wiring unit 104 (specifically, the discharge operation applies a target voltage instructed by the control circuit 10 to the conductive path 30). When the discharge stop signal is supplied from the control circuit 10, the discharging unit 5 stops the discharge operations, and puts the conductive path 30 and the second power source unit 7 into a non-conductive state. The wiring unit 104, which serves as a discharge path from the discharging unit 5 to the shift-by-wire control system 120, is provided between the output-side conductive path 30 connected to the discharging unit 5 and the shift-by-wire control system 120. Other electrical loads aside from the shift-by-wire control system 120 may be connected to the wiring unit 104.

A first signal line 34 (also called a "signal line 34" hereinafter), which serves as a signal line for transmitting signals, is provided between the vehicle speed sensor 132 and the control circuit 10. Additionally, a second signal line 36 (also called a "signal line 36" hereinafter) is provided between a conductive path 129 connected to the parking switch 124A and the control circuit 10, and a third signal line 38 (also called a "signal line 38" hereinafter) is provided between a conductive path 149 connected to the courtesy switch 144 and the control circuit 10. Note that these signals may be transmitted through communication using a CAN or the like.

A voltage detection unit 16 is a circuit that detects the output voltage of the second power source unit 7, and is constituted by a known voltage detection circuit. The voltage detection unit 16 is constituted by a known voltage division circuit, for example, divides a voltage applied to the conductive path 9 at a prescribed division ratio, and inputs the divided voltage to the control circuit 10. A detection value input to the control circuit 10 from the voltage detection unit 16 is a value that can identify the voltage applied to the conductive path 9 (a value that can identify the output voltage of the second power source unit 7), and the control circuit 10 confirms the voltage applied to the conductive path 9 using the value input from the voltage detection unit 16.

A temperature detection unit 14 is constituted by a known temperature sensor such as a thermistor, and the configuration is such that the temperature detection unit 14 outputs a voltage value, indicating a temperature at the position where the temperature detection unit 14 is disposed, to the control circuit 10. The temperature detection unit 14 is, for example, fixed so as to make contact with a surface part of the second power source unit 7, and outputs a value indicating the temperature of the surface part of the second power source unit 7 (an outer surface temperature) as a detection value. If the second power source unit 7 is mounted to a substrate, the temperature detection unit 14 may be mounted to the substrate on which the second power source unit 7 is mounted, in the vicinity of the second power source unit 7. Additionally, it is sufficient for the temperature detection unit 14 to be disposed in the vicinity of the second power source unit 7, and the temperature detection unit 14 need not be in contact with the second power source unit 7.

The control circuit 10 is configured as a microcomputer, for example, and includes a CPU, memory such as ROM or RAM, an A/D converter, and the like. The control circuit 10 is capable of operating using power from the second power source unit 7 even in situations where the supply of power from the first power source unit 91 has been cut off.

A value indicating the voltage at the wiring unit 102 (i.e., the output voltage value of the first power source unit 91) is input to the control circuit 10 by a voltage detection unit (not shown), and the control circuit 10 is configured to be capable of continuously monitoring the voltage at the wiring unit 102. The configuration through which the control circuit 10 detects the output voltage of the first power source unit 91 may be a configuration in which the wiring unit 102 and the control circuit 10 are connected by a conductive path and the voltage is directly input to the control circuit 10, or a configuration in which a voltage obtained by a voltage division circuit or the like dividing the voltage at the wiring unit 102 is input to the control circuit 10.

FIG. 1 conceptually illustrates the functions of the control circuit 10, and the control circuit 10 includes at least: a function for operating as a control unit that causes the charging unit 3 and the discharging unit 5 to carry out the charging operations or the discharge operations; a function for operating as a vehicle speed information acquisition unit that acquires vehicle speed information of the vehicle in which the power source system 110 is installed; a function for operating as a switch state detection unit that detects an on state of the ignition switch (starting switch) that starts the engine (driving power source) of the vehicle; and a function for operating as a degradation detection unit that detects degradation of the second power source unit 7. The control circuit 10 furthermore includes a function for operating as a detection unit that detects an operation of the courtesy switch 144, the parking switch 124A, and the like.

The storage unit 12 is configured as a known storage device such as non-volatile memory, and is configured to hold information even after the ignition switch (starting switch) has been switched off. The storage unit 12 stores degradation information, for example.

A method of adjusting the output voltage of the second power source unit 7 in the backup device 1 will be described next.

An ignition on signal (also called an "IG on signal" hereinafter), which indicates that the starting switch (specifically, the ignition switch) for starting the driving power source of the vehicle is on, or an ignition off signal (also called an "IG off signal" hereinafter), which indicates that the ignition switch is off, is input to the control circuit 10 illustrated in FIG. 1 from an external device (not shown).

Figure 2:
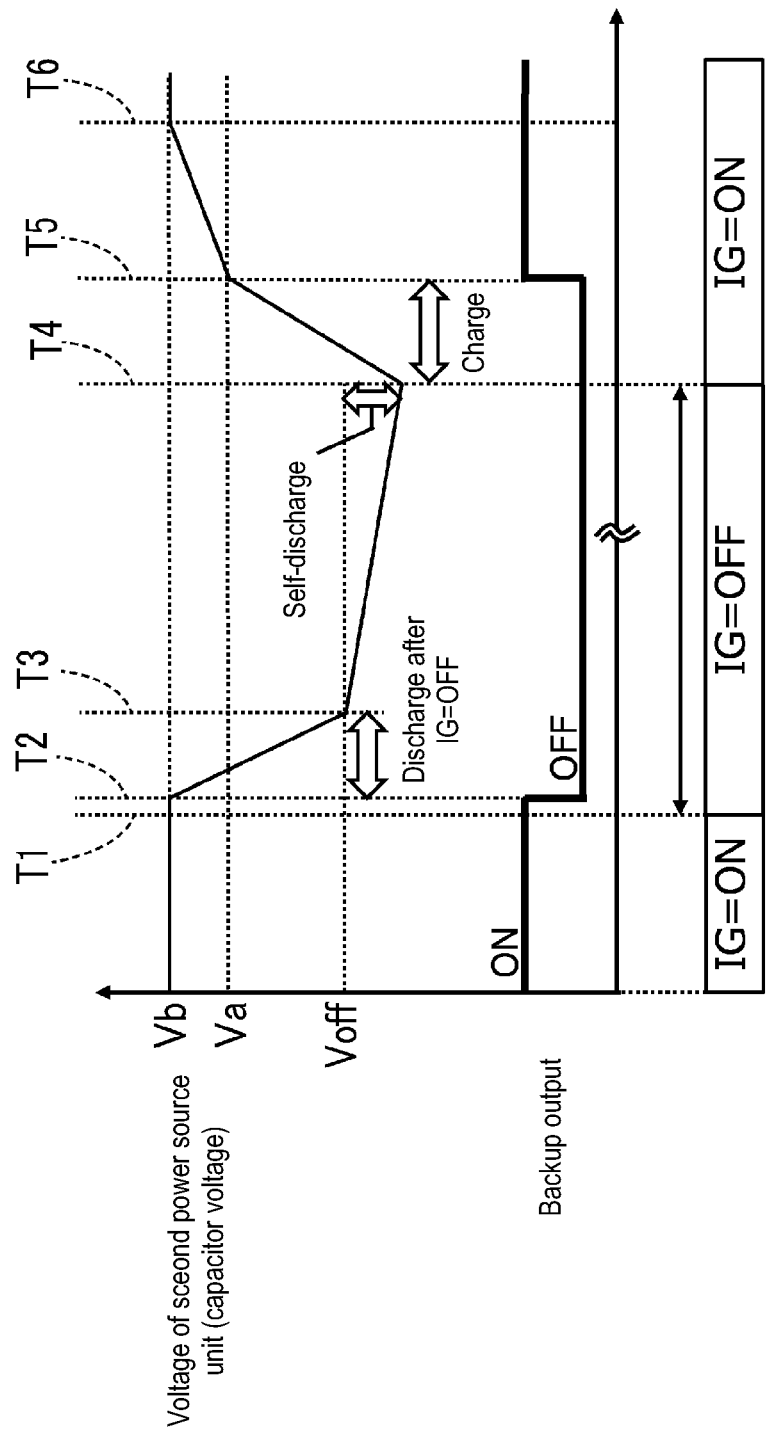
FIG. 2 is a graph illustrating the relationship between the voltage of a second power source unit, a backup output period (a period where a load to be backed up can operate), and an ignition signal, in the vehicle electronic control system illustrated in FIG. 1.

As illustrated in the descriptive diagram in FIG. 2, when the ignition switch has switched from the on state to the off state, the backup device 1 having this configuration carries out discharge control that causes the output voltage of the second power source unit 7 to drop to a target voltage value Voff used during off operation. The target voltage value Voff used during off operation is a lower value than target voltage values Va and Vb, which are set when the ignition switch is on, and is specifically set to a value lower than the minimum value in a target voltage value range that can be set when the ignition switch is on (e.g., a lowest value V1 among a plurality of candidates for the target voltage value illustrated in FIG. 5).

For example, if the ignition switch has switched from on to off at time T1 as illustrated in FIG. 2, the control circuit 10 carries out the discharge control from time T2 immediately thereafter, supplying a discharge instruction to the discharging unit 5 in a state where the charging operations of the charging unit 3 are stopped and causing the discharging unit 5 to carry out the discharge operations. The discharge operation are continued until the output voltage of the second power source unit 7 reaches the target voltage value Voff during off operation. Also as illustrated in FIG. 2, if the output voltage of the second power source unit 7 has become less than or equal to the target voltage value Voff during off operation at time T3, both the charging operations of the charging unit 3 and the discharge operations of the discharging unit 5 are stopped after time T3. In this case, after time T3, self-discharging of the second power source unit 7 causes the output voltage of the second power source unit 7 to gradually drop below the target voltage value Voff during off operation, as illustrated in FIG. 2.

Figure 3:
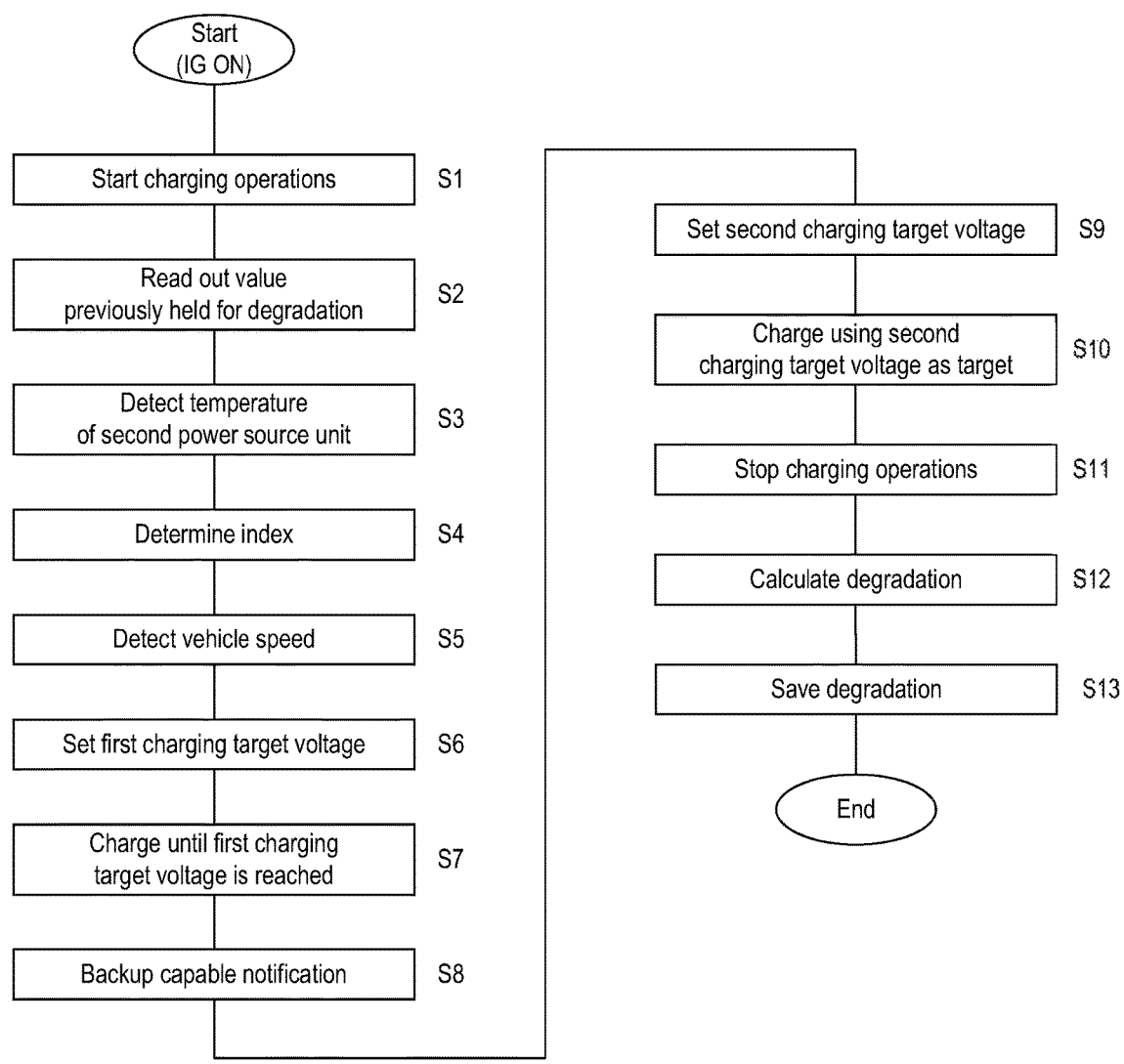
FIG. 3 is a flowchart illustrating an example of the flow of charging control carried out after an ignition switch has been turned on in the vehicle backup device of the first embodiment.

If at time T4 the ignition switch has been switched from off to on after both the charging operations of the charging unit 3 and the discharge operations of the discharging unit 5 have been stopped after time T3, i.e., if the signal input to the control circuit 10 has switched from the IG off signal to the IG on signal, the control circuit 10 starts the charging control of the second power source unit 7 illustrated in FIG. 3.

When the control illustrated in FIG. 3 has been started, first, in the step S1, the control circuit 10 (FIG. 1) starts the output of the charging instruction signal to the charging unit 3, and causes the charging unit 3 to start continuous charging operations.

After step S1, the control circuit 10 reads out the most recent degradation information held in the storage unit 12 (specifically, a value indicating a degradation calculated after the previous instance of step S13 (described later) (step S2). The degradation information read out in step S2 is held in memory (not shown) as a value indicating the degradation of the second power source unit 7.

A method for determining the degradation of the second power source unit 7 will be described here. In this configuration, the degradation is determined through the following method in the previous instance of step S12 before the readout process carried out in step S2 of FIG. 3 (step S12 in the charging control of FIG. 3, executed the previous time the ignition switch was on), and information identifying the determined degradation (the degradation information) is stored in the storage unit 12 immediately after the determination (in the previous step S13).

When determining the degradation in step S12 indicated in FIG. 3, first, an internal resistance and capacitance (fully-charged capacitance) of the second power source unit 7, at the point in time when step S12 is executed, are detected through a known method. A variety of known methods can be employed as the method for measuring the internal resistance and capacitance (fully-charged capacitance) of the second power source unit 7. For example, the methods disclosed in JP 2013-32947A, JP 2009-226996A, JP 2007-30649A, JP 2007-30650A, JP 2008-235155A, JP 2010-74871A, JP 2005-28908A, and the like can be used, but the method is of course not limited thereto.

Figures 4, 5:
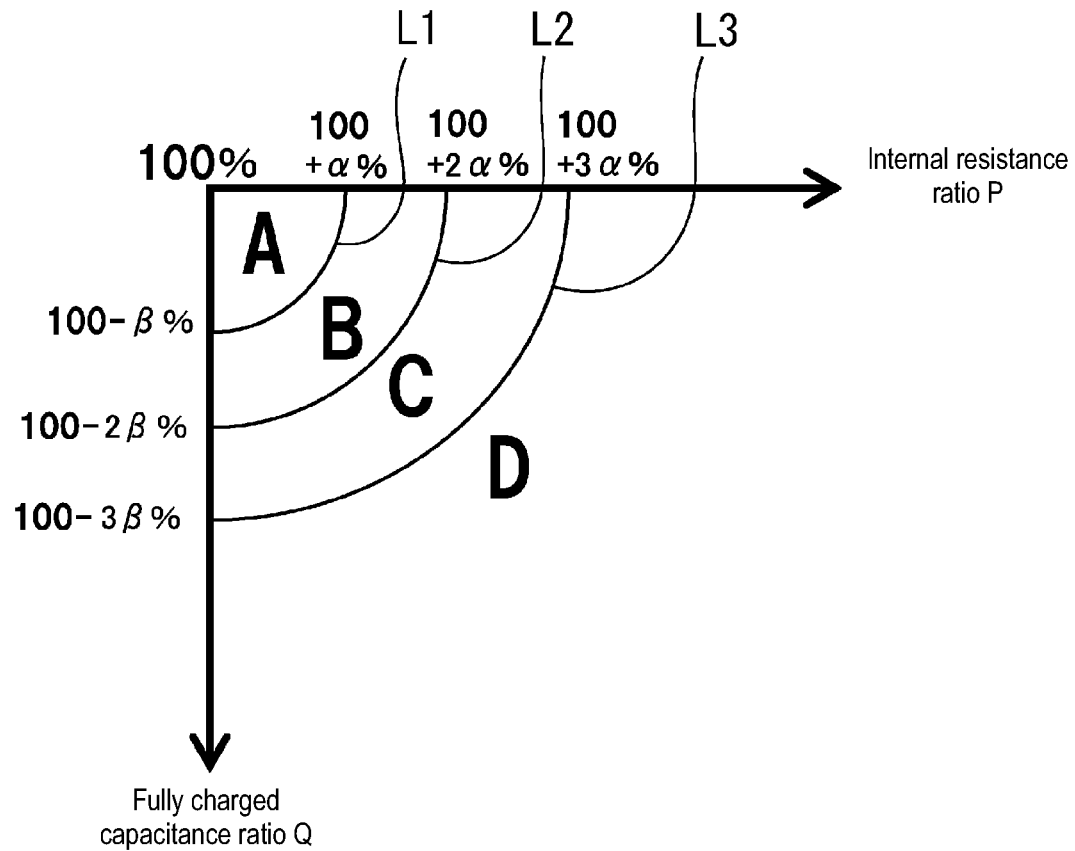
FIG. 4 is a descriptive diagram illustrating a method for determining degradation in the vehicle backup device of the first embodiment.
FIG. 5 is a table illustrating a method for determining a degradation-temperature index in the vehicle backup device of the first embodiment.

In this configuration, as illustrated in FIG. 4, a determination method is defined in which the degradation of the second power source unit 7 is determined through a determination method in which the degree of degradation increases as the internal resistance increases and a determination method in which the degree of degradation increases as the capacitance (the fully-charged capacitance) decreases. An internal resistance R0 and a fully-charged capacitance C0 at a prescribed reference time pertaining to the second power source unit 7 (specifically, the time of manufacture) are set in advance, and R0 and C0 are stored in storage means such as ROM, for example. Using this information, the degradation of the second power source unit 7 is determined by identifying which range among the degradations A, B, C, and D illustrated in FIG. 4 the combination of an internal resistance R1 and a fully-charged capacitance C1 measured at the point in time when the degradation was calculated (i.e., at the point in time of step S12). Note that the degradation A is a level where the degree of degradation is the lowest, the degradation B is a greater degree of degradation than the degradation A, the degradation C is a greater degree of degradation than the degradation B, and the degradation D is a greater degree of degradation than the degradation C. In this manner, the degradation is divided into stepwise levels.

In FIG. 4, assuming the internal resistance R0 of the second power source unit 7 at the prescribed reference time (specifically, at the time of manufacture) is 100(%), a ratio P, relative to R0, of the internal resistance R1 measured at the point in time when the degradation was calculated (i.e., at the point in time of step S12) (P=R1×100/R0) is represented by the horizontal axis. Additionally, assuming the fully-charged capacitance C0 of the second power source unit 7 at the prescribed reference time (specifically, at the time of manufacture) is 100(%), a ratio Q, relative to C0, of the fully-charged capacitance C1 measured at the point in time when the degradation was calculated (Q=C1×100/C0) is represented by the vertical axis. Once the ratio P of the internal resistance R1 to R0 and the ratio Q of the fully-charged capacitance C1 to C0 are determined, the degradation can be identified using the relationship illustrated in FIG. 4. If table data for determining the degradation according to the relationship illustrated in FIG. 4 on the basis of the internal resistance R1 and the fully-charged capacitance C1 measured in step S12 (table data in which each of sets of the internal resistance R1 and the fully-charged capacitance C1 are associated with each of degradations determined according to the relationship illustrated in FIG. 4 in accordance with the stated sets) is stored in ROM or the like in advance, the degradation can be found immediately when the internal resistance R1 and the fully-charged capacitance C1 have been calculated in step S12.

Note that a boundary line L1, which divides the ranges of the degradations A, B, C, and D in FIG. 4, can, for example, be expressed as a relational expression Q=f(P) for the ratio Q of the fully-charged capacitance, using the ratio P of the internal resistance as a variable; a boundary line L2 can, for example, be expressed as a relational expression Q=g(P) for the ratio Q of the fully-charged capacitance, using the ratio P of the internal resistance as a variable, and a boundary line L3 can, for example, be expressed as a relational expression Q=h(P) for the ratio Q of the fully-charged capacitance, using the ratio P of the internal resistance as a variable. If, when the boundary lines L1, L2, and L3 are identified using such relational expressions, the ratio P of the internal resistance and the ratio Q of the fully-charged capacitance have been calculated in step S12, which degradation the set of the calculated P and Q corresponds to can be identified by comparing the calculated P and Q with the relational expressions Q=f(P), Q=g(P), and Q=h(P). The degradation may be determined using this identification method.

In this configuration, the control circuit 10 illustrated in FIG. 1 functions as the degradation detection unit that detects the degradation of the second power source unit 7.

As illustrated in FIG. 3, the control circuit 10 (FIG. 1) acquires the detection value from the temperature detection unit 14 at a prescribed timing after step S2, and identifies the temperature indicated by the detection value (i.e., the temperature of the second power source unit 7) (step S3). Then, after step S3, the control circuit 10 determines an index (the degradation-temperature index) on the basis of the degradation read out in step S2 and the temperature of the second power source unit 7 acquired in step S3 (step S4). Specifically, as illustrated in FIG. 5, the temperatures are divided in a plurality of ranges, and the index is determined by the relationship between each temperature range and degradation. In FIG. 5, the index value increases as the temperature decreases, and the index value increases as the degradation increases. Although FIG. 5 illustrates the index value as text, specifically, Z>Y>X>W>U. In step S4 of FIG. 3, the index is determined on the basis of the degradation read out in step S2, the temperature of the second power source unit 7 acquired in step S3, and data identifying a relationship such as that illustrated in FIG. 5 (e.g., table data or the like).

As illustrated in FIG. 3, the control circuit 10 (FIG. 1) detects the vehicle speed at a prescribed timing after step S4 (step S5). The vehicle speed information generated by the vehicle speed sensor 132 is input to the control circuit 10 through communication over a dedicated line, CAN communication, or the like. The control circuit 10 corresponds to an example of the vehicle speed information acquisition unit, and functions so as to acquire the vehicle speed information directly from a sensor (the vehicle speed sensor 132, in the example illustrated in FIG. 1) that generates a signal reflecting the speed of the vehicle or via another device.

After step S5 in FIG. 3, the control circuit 10 (FIG. 1) determines the first charging target voltage (the charging target voltage) Va on the basis of the index determined in step S4 and the vehicle speed acquired in step S5 (step S6). Specifically, as illustrated in FIG. 6A, the vehicle speed is divided into a plurality of ranges, and the first charging target voltage Va is determined by the relationship between each vehicle speed range and index. In FIG. 6A, the value of the first charging target voltage Va increases as the index increases, and the value of the first charging target voltage Va increases as the vehicle speed increases. In FIG. 6A, both V1 and x are positive values.

In this manner, the control circuit 10 (FIG. 1) sets the first charging target voltage (the charging target voltage) Va on the basis of the vehicle speed information acquired from the exterior, the degradation detected by the control circuit 10, and the temperature of the second power source unit 7 detected by the temperature detection unit 14, using a setting method that sets the voltage to be higher the higher the vehicle speed is, sets the voltage to be higher the greater the degradation is, and sets the voltage to be higher the lower the temperature is. The first charging target voltage Va is a voltage that can operate at least a prescribed backup target (specifically, the shift-by-wire control system 120), and is specifically set to a voltage that is estimated to be capable of providing the power needed to operate the shift-by-wire control system 120 under the conditions at the point in time when the first charging target voltage Va was set (under the degradation, temperature, and vehicle speed conditions).

Note that when the system 100 illustrated in FIG. 1 is a system that carries out the charging operations of step S7 in a state where the vehicle speed is 0 (i.e., in a state where the vehicle is stopped) (e.g., a system in which shift operations can be carried out by the shift-by-wire control system 120 after a notification has been made in step S8), the first charging target voltage Va set in step S6 is set to the first vehicle speed range indicated in FIG. 6A (a range of less than 5 km/h) on the basis of the index determined in step S4.

As illustrated in FIG. 3, after step S6, the control circuit 10 (FIG. 1) causes the charging unit 3 to carry out charging operations for bringing the output voltage of the second power source unit 7 closer to the first charging target voltage Va set in step S6, on the basis of the output voltage of the second power source unit 7 detected by the voltage detection unit 16 (step S7). The operations in step S7 are carried out at the timing indicated as "primary charging" in FIG. 7.

Note that the control circuit 10 (FIG. 1) causes the charging operations to be carried out until the output voltage of the second power source unit 7 reaches the first charging target voltage Va, but the first charging target voltage Va may be constant, without changing, during the period for which the charging operations are carried out in step S7 of FIG. 3. Alternatively, the vehicle speed may continue to be monitored during the period while the charging operations are being carried out in step S7, and each time the vehicle speed changes, the first charging target voltage Va corresponding to the set of the changed vehicle speed and the index already determined in step S4 (the first charging target voltage identified using the data in FIG. 6A) may be changed.

Figure 7:
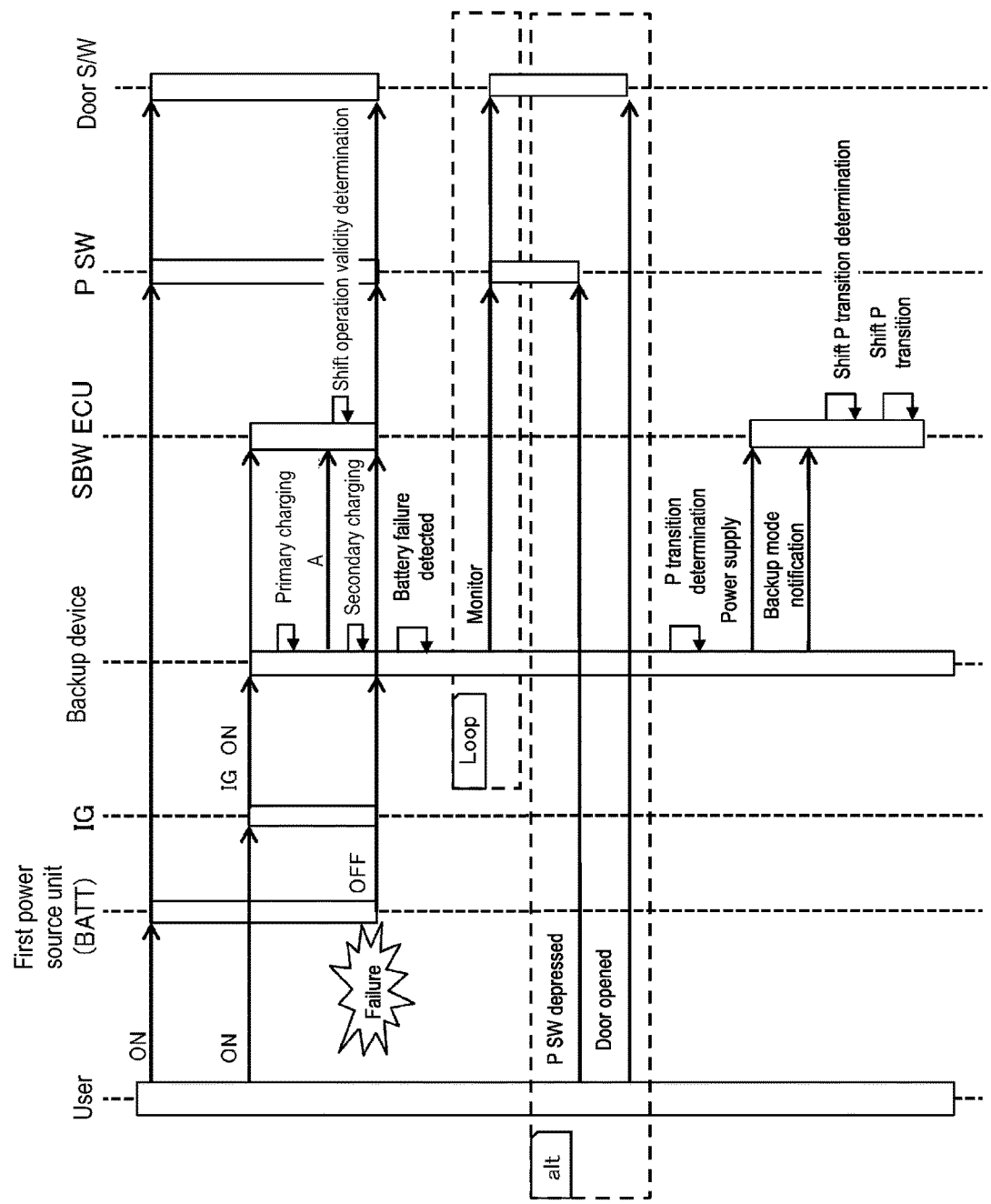
FIG. 7 is a descriptive diagram conceptually illustrating the flow of operations of each of devices in the vehicle electronic control system of FIG. 1.

The control circuit 10 (FIG. 1) carries out the charging operations of step S7 in FIG. 3 until the output voltage of the second power source unit 7 reaches the first charging target voltage Va, and once the first charging target voltage Va has been reached, makes a backup capable notification in step S8 (see also the "backup capable notification" in FIG. 7). In step S8, a notification signal indicating prescribed details is output to the shift-by-wire control system 120, which is the backup target device (specifically, the shift-by-wire ECU 122). The output of the notification signal from the control circuit 10 to the shift-by-wire control system 120 may be carried out over a dedicated line (not shown) or through CAN communication over a CAN communication line.

The shift-by-wire ECU 122 illustrated in FIG. 1 is configured to be capable of prescribed operations when the aforementioned "notification signal of prescribed details" has been received from the backup device 1. Although many examples can be given for the prescribed operations, in one representative example, a shift operation validity determination is made as indicated in FIG. 7. The shift operation validity determination is a determination to permit an operation by the user, and once this determination has been made, the actuator 126 is driven when the user operates the range switch 124 and the range switching device 128 is operated to switch to the requested range. Conversely, if the shift operation validity determination has not been made after the ignition switch (starting switch) has switched on (i.e., if the aforementioned "notification signal of prescribed details" has not been transmitted), the actuator 126 is not driven even if the user operates the range switch 124, and a shift change is not made.

The control circuit 10 (FIG. 1) sets the second charging target voltage Vb after step S8 in FIG. 3 (step S9). The second charging target voltage Vb is set to a higher value than the above-described first charging target voltage Va, and specifically, the second charging target voltage Vb can be determined on the basis of the vehicle speed and the above-described index, in accordance with a table such as that illustrated in FIG. 6B.

After step S9 in FIG. 3, the control circuit 10 (FIG. 1) causes the charging unit 3 to carry out charging operations that bring the output voltage of the second power source unit 7 closer to the second charging target voltage Vb, on the basis of the output voltage of the second power source unit 7 detected by the voltage detection unit 16 (step S10). The operations in step S10 are carried out at the timing indicated as "secondary charging" in FIG. 7.

Specifically, in step S10, the vehicle speed information generated by the vehicle speed sensor and the temperature information detected by the temperature detection unit are acquired over short time intervals while the charging operations are being carried out. Each time the values of the vehicle speed information and the temperature information are acquired, the index is found, according to the data in FIG. 5, on the basis of the temperature identified by the acquired temperature information and the degradation read out in step S2. The second charging target voltage Vb is determined on the basis of the index and the vehicle speed identified by the acquired vehicle speed information, using the data table in FIG. 6B. In the data table illustrated in FIG. 6B, the vehicle speed is divided into a plurality of ranges, and the second charging target voltage Vb is determined by the relationship between each vehicle speed range and index. In FIG. 6B, the value of the second charging target voltage Vb increases as the index increases, and the value of the second charging target voltage Vb increases as the vehicle speed increases. Note also that in FIG. 6B, V2 and y are both positive values, and for example, V2 and V1 (FIG. 6A) may be in a relationship that satisfies V2>V1, and the value of y may be the same as or different from x in FIG. 6A.

In this manner, the control circuit 10 (FIG. 1) sets the second charging target voltage (the charging target voltage) Vb on the basis of the vehicle speed information acquired from the exterior, the degradation detected by the control circuit 10, and the temperature of the second power source unit 7 detected by the temperature detection unit 14, using a setting method that sets the voltage to be higher the higher the vehicle speed is, sets the voltage to be higher the greater the degradation is, and sets the voltage to be higher the lower the temperature is. The second charging target voltage Vb is determined as a voltage that can operate all devices set as devices that should be backed up in the event the first power source unit 91 fails.

When the charging operations are carried out using such a setting method in step S10, the second charging target voltage Vb is repeatedly updated in step S10. If the updated second charging target voltage Vb drops below the output voltage of the second power source unit 7, the discharging unit 5 may be caused to carry out the discharge operations until the output voltage of the second power source unit 7 reaches the second charging target voltage Vb, and the discharging unit 5 may be caused to not carry out discharging until the ignition switch is switched off. In other words, if the updated second charging target voltage Vb falls below the output voltage of the second power source unit 7, the voltage may be maintained, without carrying out charging operations or discharge operations; the output voltage of the second power source unit 7 may be brought to the second charging target voltage Vb through charging operations only when the updated second charging target voltage Vb exceeds the output voltage of the second power source unit 7.

Additionally, when using such a method that updates the second charging target voltage Vb by checking the vehicle speed and the temperature of the second power source unit 7 in real time, the charging operations may be stopped, and the processing from step S11 carried out, at the point in time when the output voltage of the second power source unit 7 has first reached the second charging target voltage Vb; or, the processing of step S10 may be continued until the ignition switch switches off, and the processing from step S11 may be carried out after the ignition switch has switched off.

As described thus far, the control circuit 10, which corresponds to a control unit, causes the charging unit 3 to carry out the charging operations for bringing the output voltage of the second power source unit 7 closer to the first charging target voltage Va that has been set (specifically, a voltage value sufficient for operating at least the shift-by-wire control system 120 (a backup target device)) on the basis of the output voltage of the second power source unit 7 detected by the voltage detection unit 16, when it has been detected that the ignition switch (the starting switch) is on. Once the output voltage of the second power source unit 7 has reached the first charging target voltage Va, a notification signal is output to the exterior (the shift-by-wire control system 120), and after the notification signal has been output, the control circuit 10 causes the charging unit 3 to carry out the charging operations for bringing the output voltage of the second power source unit 7 closer to the second charging target voltage Vb, which is higher than the first charging target voltage Va. In the example of FIG. 2, the output voltage of the second power source unit 7 reaches the first charging target voltage Va at time T4, and reaches the second charging target voltage Vb at time T5 thereafter due to the charging operations.

In this manner, the control circuit 10 (FIG. 1) carries out the charging operations of step S10 in FIG. 3 until conditions for ending the operations are met (specifically, until the output voltage of the second power source unit 7 reaches the second charging target voltage Vb or the ignition switch is switched off), and the charging operations of the charging unit 3 are then stopped in step S11 after the conditions for ending the operations have been met. After the charging operations have been stopped in step S11, the degradation of the second power source unit 7 is calculated through the above-described calculation method (step S12). Then, after the degradation has been calculated in step S12, the control circuit 10 stores the calculated degradation in the storage unit 12.

In this configuration, the storage unit 12 corresponds to an example of a degradation information storage unit, and has a function for storing the degradation information identifying the detected degradation after the degradation of the second power source unit 7 has been detected by the control circuit 10, which corresponds to the degradation detection unit, in step S12.

The degradation stored in the storage unit 12 in this manner is read out in step S2 the next time the ignition switch switches from off to on after the control of FIG. 3 has ended (i.e., the next time the control of FIG. 3 is executed). The control circuit 10, which corresponds to the control unit, sets the charging target voltages (the first charging target voltage Va and the second charging target voltage Vb) on the basis of the read-out degradation information (i.e., the information stored before the ignition switch has been detected as being on), the temperature of the second power source unit 7 detected by the temperature detection unit 14 after the ignition switch has been detected as being on, and the vehicle speed information acquired after the temperature detection unit 14 has detected the temperature of the second power source unit 7, and then causes the charging unit 3 to carry out the charging operation for bringing the output voltage of the second power source unit 7 closer to the charging target voltages (the first charging target voltage Va and the second charging target voltage Vb) in step S7 or step S10.

Next, a case where the supply of power from the first power source unit 91 has dropped or been cut off will be described.

In the power source system 110 illustrated in FIG. 1, when the supply of power from the first power source unit 91 is normal, the output voltage from the first power source unit 91 is applied to the wiring unit 102, which serves as a power line, and power is then supplied from the first power source unit 91 to a variety of electrical components via the wiring unit 102. Here, "when the supply of power from the first power source unit 91 is normal" refers to a time when the output voltage applied to the wiring unit 102 by the first power source unit 91 exceeds a prescribed value. A value indicating the voltage applied to the wiring unit 102 (e.g., the value of the voltage at the wiring unit 102 itself, a value obtained by dividing the voltage at the wiring unit 102, or the like) is input to the control circuit 10 by a voltage detection circuit (not shown), and the control circuit 10 determines whether or not the voltage at the wiring unit 102 is less than the prescribed value by determining whether or not the detection value input from the voltage detection circuit (the value indicating the voltage applied to the wiring unit 102) is less than the threshold. Note that the prescribed value is a value that is less than the output voltage when the first power source unit 91 is fully charged but is greater than 0, and is set to a value that is slightly higher than 0 V, for example.

The control circuit 10 illustrated in FIG. 1 continuously monitors the voltage at the wiring unit 102, to which is applied the output voltage from the first power source unit 91, after the ignition switch (the starting switch) has been switched on. The control circuit 10 then repeatedly determines whether or not the voltage at the wiring unit 102 is less than the prescribed value, and starts monitoring user operations when it has been determined that the voltage is less than the prescribed value. In FIG. 7, operations carried out when the control circuit 10 has determined that the voltage at the wiring unit 102 is less than the prescribed value are indicated by "BATT failure detected", and the control circuit 10 monitors user operations after this detection. Note that the control circuit 10 is configured to be capable of operating even when the supply of power from the first power source unit 91 has been cut off, by using power from the second power source unit 7.

The user operations monitored after it has been determined that the voltage at the wiring unit 102 is less than the prescribed value are, for example, an operation of the parking switch 124A for instructing a transition to the parking range (e.g., an operation of the pressing the parking switch (PSW) 124A), or an operation of turning the courtesy switch 144 on (e.g., an operation for opening a door). In the example of FIG. 1, the configuration is such that a prescribed voltage is applied from the shift-by-wire ECU 122 and the control circuit 10 to the conductive path 129 connected to one end of the parking switch 124A. The voltage at the conductive path 129 is at a high level, which is greater than or equal to a prescribed voltage threshold, when an operation for turning the parking switch 124A on (an operation instructing the parking range) is not being made, and is at a lower level, which is less than the prescribed voltage threshold, when an operation for turning the parking switch 124A on (an operation instructing the parking range) is being made. If the signal line 36 connected to the conductive path 129 is at low level, the control circuit 10 determines that the parking switch 124A is on, whereas if the signal line 36 is at high level, the control circuit 10 determines that the parking switch 124A is off. Likewise, the configuration is such that a prescribed voltage is applied from the body ECU 140 and the control circuit 10 to the conductive path 149 connected to one end of the courtesy switch 144. The voltage at the conductive path 149 is at a high level, which is greater than or equal to a prescribed voltage threshold, when an operation for turning the courtesy switch 144 on (an operation of opening a door of the vehicle) is not being made, and is at a lower level, which is less than the prescribed voltage threshold, when an operation for turning the courtesy switch 144 on (an operation of opening the door of the vehicle) is being made. If the signal line 38 connected to the conductive path 149 is at low level, the control circuit 10 determines that the courtesy switch 144 is on, whereas if the signal line 38 is at high level, the control circuit 10 determines that the courtesy switch 144 is off.

The control circuit 10 determines whether or not either the parking switch 124A or the courtesy switch 144 has turned on. Specifically, it is determined whether or not either the second signal line 36 or the third signal line 38 has switched to low level, which indicates an on state, and it is determined that a user operation has been made if either the second signal line 36 or the third signal line 38 has switched to low level. In FIG. 7, processing carried out when it has been determined that a user operation has been made in this manner is indicated by "P transition determination". If it has been determined that a user operation has been made, the control circuit 10 causes the discharging unit 5 to carry out a discharge operation for the second power source unit 7, and power is supplied from the second power source unit 7 to the shift-by-wire ECU 122 as a result (see "power source supply" in FIG. 7). Furthermore, the control circuit 10 makes a notification to the shift-by-wire ECU 122 that a mode in which backup is being carried out by the second power source unit 7 (a backup mode) is in effect (a backup mode notification). If power is being supplied from the second power source unit 7 and the backup mode notification has been received from the backup device 1, the shift-by-wire ECU 122 causes the actuator 126 to operate so as to switch the range switching device 128 to the P range (a state in which both the forward clutch and the reverse clutch are disengaged and the parking lock mechanism is operational). In FIG. 7, the operations carried out when the shift-by-wire ECU 122 has detected the backup mode notification from the backup device 1 are indicated by "shift P transition determination", and the operations for switching to the P range carried out thereafter are indicated by "shift P transition".

Examples of the effects of this configuration will be given here.

In the system 100 illustrated in FIG. 1, it is assumed that when the supply of power from the first power source unit 91 has been cut off, it will take a greater amount of time for the vehicle to stop the higher the vehicle speed is at the point in time when the supply of power from the first power source unit 91 is stopped. In other words, it is assumed that more power will be necessary for the backup the higher the vehicle speed is at the point in time when the supply of power from the first power source unit 91 is stopped. Accordingly, if, as described above, the charging target voltage (the first charging target voltage Va or the second charging target voltage Vb) is set through a setting method that sets the voltage to be higher the higher the vehicle speed indicated by the vehicle speed information is, and the charging unit 3 is caused to carry out the charging operations for bringing the output voltage of the second power source unit 7 closer to the set charging target voltage, a greater amount of power can be supplied from the second power source unit 7 the higher the vehicle speed is, and thus the output voltage of the second power source unit 7 can be set appropriately in accordance with the traveling state of the vehicle. For example, when the vehicle speed is high, setting the charging target voltage (the first charging target voltage Va or the second charging target voltage Vb) to relatively high settings and carrying out the charging operations makes it possible to increase the power that can be supplied from the second power source unit 7. Conversely, when the vehicle speed is low, setting the charging target voltages to relatively low settings and carrying out the charging operations makes it possible to complete the charging operations more quickly.

Furthermore, the backup device 1 includes the degradation detection unit, which detects degradation of the second power source unit 7. On the basis of at least the vehicle speed information acquired by the vehicle speed information acquisition unit and the degradation detected by the degradation detection unit, the control unit sets the charging target voltage (the first charging target voltage Va or the second charging target voltage Vb) through a setting method that sets the voltage to be higher the greater the degradation detected by the degradation detection unit is, and causes the charging unit 3 to carry out the charging operations for bringing the output voltage of the second power source unit 7 closer to the charging target voltage.

The backup device 1 can more appropriately set the charging target voltage (the first charging target voltage Va or the second charging target voltage Vb) so as to reflect the degradation of the second power source unit 7, in addition to the vehicle speed. As the degree of degradation of the second power source unit 7 increases, the performance of the second power source unit 7 decreases due to a drop in the capacitance and a rise in the internal resistance, and thus if the charging target voltages are set through a setting method that sets a higher voltage the greater the degradation detected by the degradation detection unit is, the output voltage of the second power source unit 7 can be set more appropriately in accordance with the degree of degradation of the second power source unit 7.

Furthermore, the backup device 1 includes the storage unit 12 that, after the degradation detection unit has detected the degradation of the second power source unit 7, stores the degradation information identifying the detected degradation (the degradation information storage unit), and the switch state detection unit that detects an on state in the ignition switch (the starting switch) for starting the driving power source (the engine) of the vehicle. If the switch state detection unit has detected an on state in the ignition switch, the control unit sets the charging target voltage (the first charging target voltage Va or the second charging target voltage Vb) on the basis of the degree of degradation stored in the storage unit 12 (the degradation information storage unit) before the switch state detection unit detects the on state of the ignition switch (i.e., the degradation saved in the previous instance of step S14) and the vehicle speed information acquired by the vehicle speed information acquisition unit after the switch state detection unit detected the on state in the ignition switch, and then causes the charging unit 3 to carry out the charging operations for bring the output voltage of the second power source unit 7 closer to the charging target voltages.

In this manner, if the degradation information stored in the storage unit 12 (the degradation information storage unit) from before the switch state detection unit detects the on state in the ignition switch (starting switch) is used, it is no longer necessary to measure the degradation after the on state has been detected in the ignition switch, and the time it takes for the output voltage of the second power source unit 7 to reach the charging target voltage (the first charging target voltage Va or the second charging target voltage Vb) after the ignition switch has switched on can be shortened by that amount. Additionally, it is unlikely that the degradation of the second power source unit 7 will advance suddenly before or after the switching of the ignition switch, and thus a high level of accuracy can be achieved even when using the degradation information stored in the storage unit 12 (the degradation information storage unit) from before the on state is detected in the ignition switch.

Furthermore, the backup device 1 includes the temperature detection unit 14, which detects the temperature of the second power source unit 7. The control unit sets the charging target voltage (the first charging target voltage Va or the second charging target voltage Vb) on the basis of at least the vehicle speed information acquired by the vehicle speed information acquisition unit and the temperature of the second power source unit 7 detected by the temperature detection unit 14, and then causes the charging unit 3 to carry out the charging operations for bringing the output voltage of the second power source unit 7 closer to the charging target voltage.

In this manner, the backup device 1 can set the charging target voltage (the first charging target voltage Va or the second charging target voltage Vb) so as to reflect not only the vehicle speed, but also the temperature. The temperature of the second power source unit 7 is closely related to the performance of the second power source unit 7, and thus setting the charging target voltage on the basis of the vehicle speed information acquired by the vehicle speed information acquisition unit and the temperature of the second power source unit 7 detected by the temperature detection unit 14 makes it possible to more appropriately set the output voltage of the second power source unit 7.

Specifically, when the switch state detection unit has detected an on state in the ignition switch, the control unit sets the charging target voltage (the first charging target voltage Va or the second charging target voltage Vb) on the basis of the degradation information stored in the storage unit 12 (the degradation information storage unit) before the switch state detection unit detects the on state in the ignition switch, the temperature of the second power source unit detected by the temperature detection unit 14 after the switch state detection unit has detected the on state in the ignition switch, and the vehicle speed information acquired by the vehicle speed information acquisition unit after the temperature detection unit 14 has detected the temperature of the second power source unit, and causes the charging unit 3 to carry out the charging operations for bringing the output voltage of the second power source unit 7 closer to the charging target voltage.

In this manner, using the degradation information stored in the storage unit 12 (the degradation information storage unit) before detecting the on state in the ignition switch makes it possible to shorten the time it takes for the output voltage of the second power source unit 7 to reach the charging target voltage (the first charging target voltage Va or the second charging target voltage Vb) after the ignition switch has switched on, while at the same time ensuring the accuracy of the degradation. On the other hand, with respect to the temperature and the vehicle speed, the temperature of the second power source unit 7 and the vehicle speed confirmed after the on state has been detected in the ignition switch are used, and thus the output voltage of the second power source unit 7 can be set more appropriately using the temperature and vehicle speed from a time close to the time at which the charging target voltage is set. Furthermore, it is likely that the temperature of the second power source unit 7 will vary at a lower rate than the vehicle speed during a period from when the ignition switch has switched on to when the output voltage of the second power source unit 7 reaches the charging target voltage, and is therefore easier to use more accurate data for the temperature of the second power source unit 7 and the vehicle speed by detecting the temperature of the second power source unit 7 and using the temperature in the computations before the vehicle speed.

Additionally, according to the backup device 1, when the switch state detection unit has detected an on state in the ignition switch (starting switch), the control unit causes the charging unit 3 to carry out the charging operations for bringing the output voltage of the second power source unit 7 closer to the set first charging target voltage Va on the basis of the output voltage of the second power source unit 7 detected by the voltage detection unit 16, and outputs a notification signal to the exterior once the output voltage of the second power source unit 7 has reached the first charging target voltage Va. In this manner, a notification signal can be output to the exterior at a stage partway through the charging operations carried out after the ignition switch has switched on (a stage where the first charging target voltage Va has been reached), and a device that can acquire this notification signal (the shift-by-wire control system 120) can carry out prescribed operations having reliably confirmed that the output voltage of the second power source unit 7 has reached the first charging target voltage Va. In other words, an environment in which the shift-by-wire control system 120 can carry out prescribed operations having reliably confirmed that the output voltage of the second power source unit 7 has reached the first charging target voltage Va can be realized more quickly after the ignition switch has switched on. The shift-by-wire control system 120 can carry out the prescribed operations (specifically, operations for causing the actuator 126 to operate and switch the shift range so that the vehicle can travel) without waiting for the second power source unit 7 to reach its final output voltage (the second charging target voltage Vb).

According to this configuration, a shift change can be made by the shift-by-wire control system 120 after the output voltage of the second power source unit 7 has reached the first charging target voltage Va, and thus the vehicle can enter a traveling state; however, if the first power source unit 91 has failed while the vehicle is traveling, the voltage needed to operate the shift-by-wire control system 120 (the first charging target voltage Va) is already secured by the second power source unit 7, and thus the shift-by-wire control system 120 can be reliably operated so as to transition to the P range or the like.

Additionally, according to this configuration, the charging unit 3 is caused to carry out the charging operations for bringing the output voltage of the second power source unit 7 closer to the second charging target voltage Vb, which is greater than the first charging target voltage Va, after the notification signal has been output from the control circuit 10; it is therefore easier to secure the backup voltage required by devices for which it is desirable to have a greater backup voltage (the output voltage of the second power source unit 7) than the first charging target voltage Va after preferentially outputting the notification signal.

Other Embodiments

The present disclosure is not limited to the embodiments described above with reference to the drawings, and embodiments such as the following, for example, also fall within the technical scope of the present disclosure.

In the foregoing embodiment, a lead battery is used as the first power source unit 91, but the configuration is not limited thereto. Another known type of storage battery, aside from a lead battery, may be used in the foregoing embodiment or examples in which the foregoing embodiment has been changed. The number of power source means constituting the first power source unit 91 is not limited to 1, and the first power source unit 91 may be constituted by a plurality of power source means.

In the foregoing embodiment, an electrical double-layer capacitor (EDLC) is used as the second power source unit 7, but the configuration is not limited thereto. Another storage means such as a lithium-ion battery, a lithium-ion capacitor, a nickel-hydrogen battery, or the like may be used as the second power source unit 7 in the foregoing embodiment or examples in which the foregoing embodiment has been changed. The number of storage means constituting the second power source unit 7 is not limited to 1, and the second power source unit 7 may be constituted by a plurality of storage means.

FIG. 1 illustrates the vehicle speed sensor as an example of a sensor that outputs a signal reflecting the vehicle speed, but the vehicle speed may be ascertained through a known method on the basis of information acquired from a wheel speed sensor, an accelerometer, or the like (the wheel speed, the acceleration of the vehicle, or the like) in the foregoing embodiment or examples in which the foregoing embodiment has been changed. In either case, the information from the sensor may be input directly to the backup device 1 through a dedicated signal line, or may be input to the backup device 1 through CAN communication or the like.

The foregoing embodiment describes the shift-by-wire control system 120 as an example of a backup target device, but the foregoing embodiment or examples in which the foregoing embodiment has been changed are not limited thereto. The backup target device may be a different device, such as electrically-powered steering (EPS) or the like, for example.

The foregoing embodiment describes an example in which the charging unit 3 is configured as a DC-DC converter, but the foregoing embodiment or examples in which the foregoing embodiment has been changed are not limited thereto, and a variety of known charging circuits can be used.

The foregoing embodiment describes an example in which the discharging unit 5 is configured as a DC-DC converter, but the foregoing embodiment or examples in which the foregoing embodiment has been changed are not limited thereto, and a variety of known discharging circuits can be used.

In the foregoing embodiments, the control unit, the vehicle speed information acquisition unit, the degradation detection unit, and the switch state detection unit are all realized by the control circuit 10, but one or more of these functions, or all of the functions, may be realized by individual control circuits in the foregoing embodiment or examples in which the foregoing embodiment has been changed.

Although the foregoing embodiment describes an example in which the degradation is measured, a state of health (SOH) may be measured through a variety of known methods, such as the method disclosed in JP 2007-30649A, and the SOH may be used as the degradation, in the foregoing embodiment or examples in which the foregoing embodiment has been changed. For example, if the SOH measured through the known method is a first range, the SOH may be taken as the degradation A illustrated in FIG. 4; if the SOH is a second range that is lower than the first range, the SOH may be taken as the degradation B illustrated in FIG. 4; if the SOH is a third range that is lower than the second range, the SOH may be taken as the degradation C illustrated in FIG. 4; and if the SOH is a fourth range that is lower than the third range, the SOH may be taken as the degradation D illustrated in FIG. 4.

Although the foregoing embodiment describes an example in which the charging target voltage is set using three parameters, namely the vehicle speed, the degradation, and the temperature, the first charging target voltage Va or the second charging target voltage Vb may be set using only the vehicle speed as a parameter in the foregoing embodiment or examples in which the foregoing embodiment has been changed. For example, the setting method may be a method in which the charging target voltage increases in stages as the vehicle speed increases, or a method in which the charging target voltage increases continuously as the vehicle speed increases. For example, regardless of the temperature or degradation, the second charging target voltage Vb may be set to V2 when the vehicle speed is within a first vehicle speed range, the second charging target voltage Vb may be set to V2+y when the vehicle speed is within a second vehicle speed range, the second charging target voltage Vb may be set to V2+2y when the vehicle speed is within a third vehicle speed range, and the second charging target voltage Vb may be set to V2+3y when the vehicle speed is within a fourth vehicle speed range.

Although the foregoing embodiment describes an example in which the charging target voltage is set using three parameters, namely the vehicle speed, the degradation, and the temperature, the first charging target voltage Va or the second charging target voltage Vb may be set using only the vehicle speed and the degradation as parameters in the foregoing embodiment or examples in which the foregoing embodiment has been changed. For example, when setting the second charging target voltage VB, the voltage may be set as indicated by the row in the index U in FIG. 6B when the degradation is the degradation A illustrated in FIG. 4, as indicated by the row in the index W in FIG. 6B when the degradation is the degradation B illustrated in FIG. 4, as indicated by the row in the index X in FIG. 6B when the degradation is the degradation C illustrated in FIG. 4, and as indicated by the row in the index Y in FIG. 6B when the degradation is the degradation D illustrated in FIG. 4. In other words, the second charging target voltage Vb may be determined according to the degradation and vehicle speed so that the second charging target voltage Vb increases as the degradation increases and the second charging target voltage Vb increases as the vehicle speed increases. In this case, for example, when the degradation is the degradation A, the second charging target voltage Vb may be set to V2 when the vehicle speed is within a first vehicle speed range, the charging target voltage may be set to V2+y when the vehicle speed is within a second vehicle speed range, the second charging target voltage Vb may be set to V2+2y when the vehicle speed is within a third vehicle speed range, and the second charging target voltage Vb may be set to V2+3y when the vehicle speed is within a fourth vehicle speed range. When the degradation is the degradation B, the second charging target voltage Vb may be set to V2+y when the vehicle speed is within the first vehicle speed range, the second charging target voltage Vb may be set to V2+2y when the vehicle speed is within the second vehicle speed range, the second charging target voltage Vb may be set to V2+3y when the vehicle speed is within the third vehicle speed range, and the second charging target voltage Vb may be set to V2+4y when the vehicle speed is within the fourth vehicle speed range.

Although the foregoing embodiment describes an example in which the charging target voltage is set using three parameters, namely the vehicle speed, the degradation, and the temperature, the first charging target voltage Va or the second charging target voltage Vb may be set using only the vehicle speed and the degradation as parameters in the foregoing embodiment or examples in which the foregoing embodiment has been changed. For example, when setting the second charging target voltage VB, the voltage may be set as indicated by the row in the index U in FIG. 6B when the temperature is a first temperature range (20° C. and above) illustrated in FIG. 4, as indicated by the row in the index W in FIG. 6B when the temperature is a second temperature range (0° C. to 20° C.) illustrated in FIG. 4, as indicated by the row in the index X in FIG. 6B when the temperature is a third temperature range (−20° C. to 0° C.) illustrated in FIG. 4, and as indicated by the row in the index Y in FIG. 6B when the temperature is a fourth temperature range (up to −20° C.) illustrated in FIG. 4. In this case, the second charging target voltage Vb may be determined according to the temperature and vehicle speed so that the second charging target voltage Vb increases as the temperature decreases and the second charging target voltage Vb increases as the vehicle speed increases.

The foregoing embodiment describes an example in which the vehicle speed and temperature are detected in real time in step S10 of FIG. 3, and the second charging target voltage Vb is repeatedly updated. However, in the foregoing embodiments or examples in which the embodiments have been changed, in step S9, the second charging target voltage Vb may be determined as a fixed value sufficient for backing up all of the functions necessary at a maximum vehicle speed anticipated in advance (e.g., 180 km/h), and in step S10, the second power source unit 7 may be charged using this fixed value as a target value.

Figure 8:
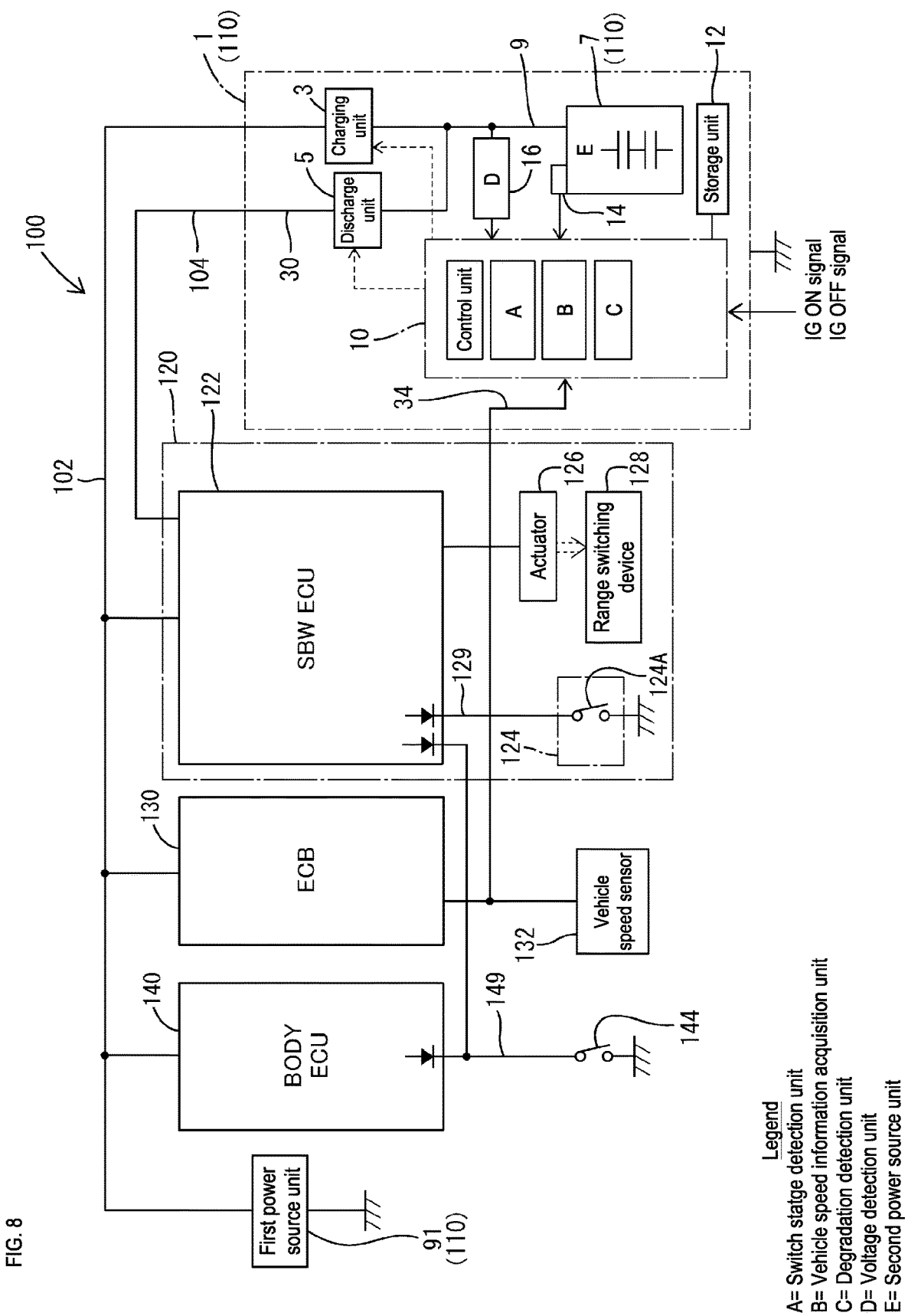
FIG. 8 is a block diagram schematically illustrating an example of a vehicle electronic control system including a vehicle backup device according to another embodiment.
Figure 9:
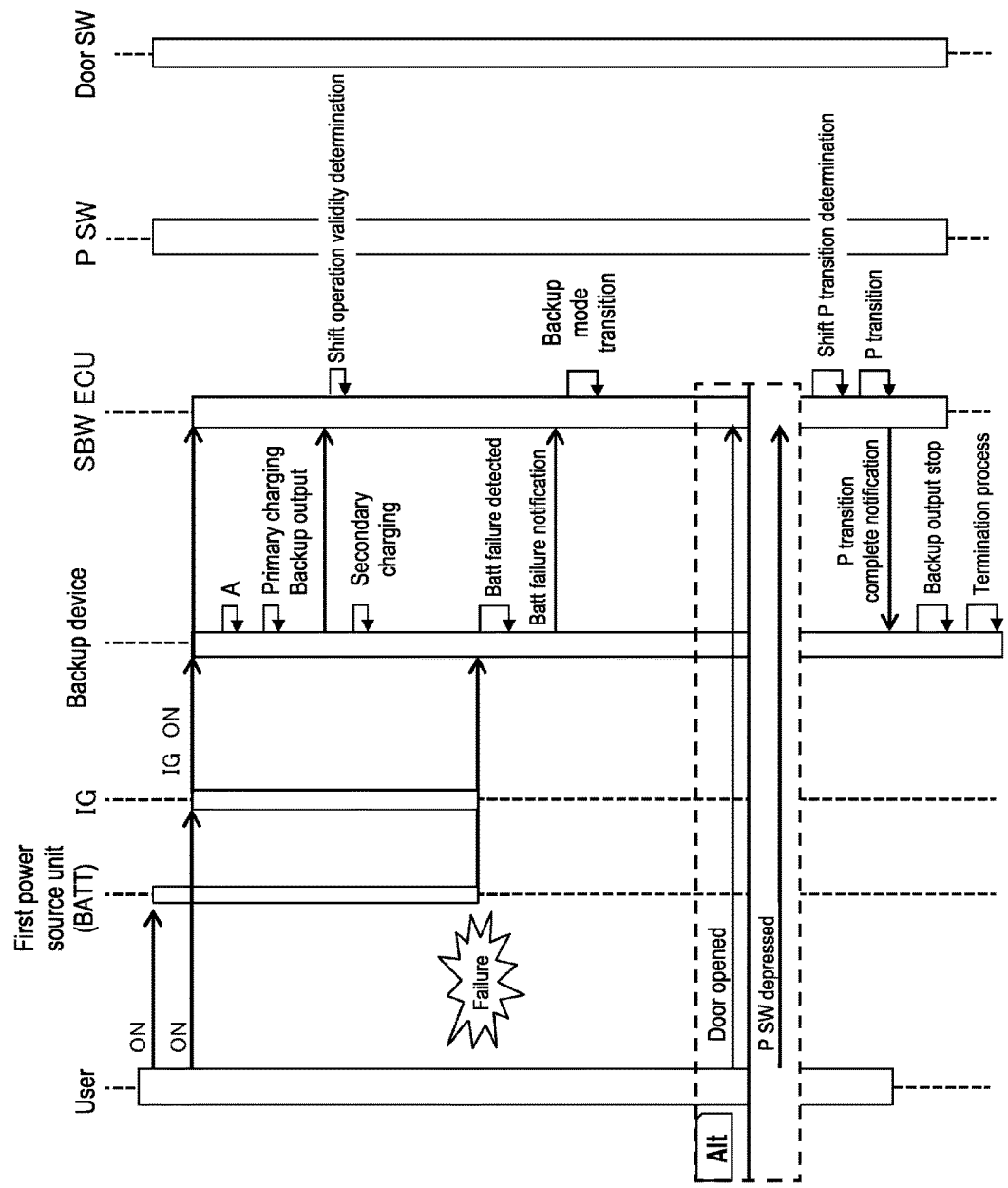
FIG. 9 is a descriptive diagram conceptually illustrating the flow of operations in the vehicle electronic control system of FIG. 8.

Although the foregoing embodiment describes an example in which the backup device 1 is applied in a system 100 such as that illustrated in FIG. 1, the backup device 1 may be a device applied in a system 100 such as that illustrated in FIG. 8. The system illustrated in FIG. 8 is the same as that in the first embodiment, aside from that the shift-by-wire ECU 122 detects whether the parking switch 124A is on or off, the shift-by-wire ECU 122 detects whether the courtesy switch 144 is on or off, and that the operations carried out when the control circuit 10 has detected an abnormality in the output of the first power source unit 91 (i.e., the operations carried out after it has been detected that the voltage at the wiring unit 102 is less than a prescribed value) are different from those carried out in the first embodiment. In the example illustrated in FIGS. 8 and 9, when the control circuit 10 has detected an abnormality in the output of the first power source unit 91 (i.e., when it has been detected that the voltage at the wiring unit 102 is less than a prescribed value), the control circuit 10 makes a notification to the shift-by-wire ECU 122 that a failure has occurred as indicated in FIG. 9 (the "BATT failure notification" in FIG. 9). Upon acquiring this notification, the shift-by-wire ECU 122 transitions to the backup mode, continuously monitors the switch state of the parking switch 124A or the courtesy switch 144 thereafter, and repeatedly determines whether or not either of the switches has turned on. Upon determining that either the parking switch 124A or the courtesy switch 144 has turned on, the shift-by-wire ECU 122 causes the actuator 126 to operate, and switches the range switching device 128 to the P range (a state where the forward clutch and the reverse clutch are both disengaged and the parking lock mechanism is operational). In FIG. 9, the shift-by-wire ECU 122 determining that a user operation has been detected (i.e., an operation that turns the parking switch 124A or the courtesy switch 144 on) is indicated by "shift P transition determination", and the operation when the P range is switched to thereafter is indicated by "P transition". After switching to the P range, the shift-by-wire ECU 122 outputs a completion notification to the backup device 1 (the "P transition completion notification" in FIG. 9), and upon acquiring this completion notification, the backup device 1 stops the discharge operations of the second power source unit 7 (the "backup output stop" in FIG. 9). A predetermined termination process is then carried out.

The invention claimed is:

1. A backup device for a vehicle power source system, the power source system including a first power source unit installed in the vehicle and a second power source unit serving as a power supply source at least when a power supply from the first power source unit has been cut off, the backup device comprising:
a charging unit that carries out a charging operation of charging the second power source unit on the basis of the power supply from the first power source unit;
a voltage detection unit that detects an output voltage of the second power source unit;
a vehicle speed information acquisition unit that acquires vehicle speed information; and
a control unit that, on the basis of the vehicle speed information acquired by the vehicle speed information acquisition unit, sets a charging target voltage of the second power source unit to be higher the greater a vehicle speed indicated by the vehicle speed information is, and, on the basis of the output voltage of the second power source unit detected by the voltage detection unit, causes the charging unit to carry out a charging operation for bringing the output voltage of the second power source unit closer to the charging target voltage.

2. The vehicle backup device according to claim 1, further comprising:
a degradation detection unit that detects degradation of the second power source unit,
wherein on the basis of at least the vehicle speed information acquired by the vehicle speed information acquisition unit and the degradation detected by the degradation detection unit, the control unit sets the charging target voltage to be higher the greater the degradation detected by the degradation detection unit is, and causes the charging unit to carry out the charging operation for bringing the output voltage of the second power source unit closer to the charging target voltage.

3. The vehicle backup device according to claim 2, further comprising:
a degradation information storage unit that stores degradation information for identifying the detected degradation after the degradation detection unit has detected the degradation of the second power source unit; and
a switch state detection unit that detects an on state in a starting switch that starts a driving power source of the vehicle,
wherein when the switch state detection unit has detected the on state in the starting switch, the control unit sets the charging target voltage on the basis of the degradation information stored in the degradation information storage unit from before the switch state detection unit has detected the on state in the starting switch and the vehicle speed information acquired by the vehicle speed information acquisition unit after the switch state detection unit has detected the on state in the starting switch, and causes the charging unit to carry out the charging operation for bringing the output voltage of the second power source unit closer to the charging target voltage.

4. The vehicle backup device according to claim 1, further comprising:
a temperature detection unit that detects a temperature of the second power source unit,
wherein the control unit sets the charging target voltage on the basis of at least the vehicle speed information acquired by the vehicle speed information acquisition unit and the temperature of the second power source unit detected by the temperature detection unit, and causes the charging unit to carry out the charging operation for bringing the output voltage of the second power source unit closer to the charging target voltage.

5. The vehicle backup device according to claim 1, further comprising:
   a degradation detection unit that detects degradation of the second power source unit;
   a degradation information storage unit that stores degradation information for identifying the detected degradation after the degradation detection unit has detected the degradation of the second power source unit;
   a temperature detection unit that detects a temperature of the second power source unit; and
   a switch state detection unit that detects an on state in a starting switch that starts a driving power source of the vehicle,
   wherein when the switch state detection unit has detected the on state in the starting switch, the control unit sets the charging target voltage on the basis of the degradation information stored in the degradation information storage unit from before the switch state detection unit has detected the on state in the starting switch, the temperature of the second power source unit detected by the temperature detection unit after the switch state detection unit has detected the on state in the starting switch, and the vehicle speed information acquired by the vehicle speed information acquisition unit after the temperature detection unit has detected the temperature of the second power source unit, and causes the charging unit to carry out the charging operation for bringing the output voltage of the second power source unit closer to the charging target voltage.

6. A backup device for a vehicle power source system, the power source system including a first power source unit installed in the vehicle and a second power source unit serving as a power supply source at least when a power supply from the first power source unit has been cut off, the backup device comprising:
   a charging unit that carries out a charging operation of charging the second power source unit on the basis of the power supply from the first power source unit;
   a voltage detection unit that detects an output voltage of the second power source unit;
   a switch state detection unit that detects an on state in a starting switch that starts a driving power source of the vehicle; and
   a control unit that, when the switch state detection unit has detected the on state in the starting switch, causes the charging unit to carry out a charging operation for bringing the output voltage of the second power source unit closer to a set first charging target voltage on the basis of the output voltage of the second power source unit detected by the voltage detection unit, outputs a notification signal to the exterior when the output voltage of the second power source unit has reached the first charging target voltage, and after outputting the notification signal, causes the charging unit to carry out a charging operation for bringing the output voltage of the second power source unit closer to a second charging target voltage that is greater than the first charging target voltage.

7. The vehicle backup device according to claim 6, further comprising:
   a degradation detection unit that detects degradation of the second power source unit,
   wherein when the switch state detection unit has detected the on state in the starting switch, the control unit sets the first charging target voltage on the basis of at least the degradation detected by the degradation detection unit, using a setting method that sets the voltage to be higher the greater the degradation detected by the degradation detection unit is, and causes the charging unit to carry out the charging operation for bringing the output voltage of the second power source unit closer to the first charging target voltage.

8. The vehicle backup device according to claim 7, further comprising:
   a degradation information storage unit that stores degradation information for identifying the detected degradation after the degradation detection unit has detected the degradation of the second power source unit,
   wherein when the switch state detection unit has detected the on state in the starting switch, the control unit sets the first charging target voltage on the basis of the degradation information stored in the degradation information storage unit from before the switch state detection unit has detected the on state in the starting switch, and causes the charging unit to carry out the charging operation for bringing the output voltage of the second power source unit closer to the first charging target voltage.

9. The vehicle backup device according to claim 6, further comprising:
   a temperature detection unit that detects a temperature of the second power source unit,
   wherein when the switch state detection unit has detected the on state in the starting switch, the control unit sets the first charging target voltage on the basis of at least the temperature of the second power source unit detected by the temperature detection unit, and causes the charging unit to carry out the charging operation for bringing the output voltage of the second power source unit closer to the first charging target voltage.

10. The vehicle backup device according to claim 6, further comprising:
    a vehicle speed information acquisition unit that acquires vehicle speed information,
    wherein when the output voltage of the second power source unit has reached the first charging target voltage, the control unit sets the second charging target voltage on the basis of at least the vehicle speed information acquired by the vehicle speed information acquisition unit, using a setting method that sets the voltage to be higher the greater a vehicle speed indicated by the vehicle speed information is, and causes the charging unit to carry out a charging operation for bringing the output voltage of the second power source unit closer to the second charging target voltage on the basis of the output voltage of the second power source unit detected by the voltage detection unit.

11. The vehicle backup device according to claim 6, further comprising:
    a degradation detection unit that detects degradation of the second power source unit,
    wherein when the output voltage of the second power source unit has reached the first charging target voltage, the control unit sets the second charging target voltage on the basis of at least the degradation detected by the degradation detection unit, using a setting method that sets the voltage to be higher the greater the degradation detected by the degradation detection unit is, and causes the charging unit to carry out the charging operation for bringing the output voltage of the second power source unit closer to the second charging target voltage.

12. The vehicle backup device according to claim 6, further comprising:

a temperature detection unit that detects a temperature of the second power source unit, wherein when the output voltage of the second power source unit has reached the first charging target voltage, the control unit sets the second charging target voltage on the basis of at least the temperature of the second power source unit detected by the temperature detection unit, and causes the charging unit to carry out the charging operation for bringing the output voltage of the second power source unit closer to the second charging target voltage.

* * * * *